United States Patent [19]

Bailey

[11] 4,398,349

[45] Aug. 16, 1983

[54] PRECISION TOOLS AND PRECISION TOOL SETS, AND METHODS OF CONSTRUCTING AND UTILIZING SAME

[76] Inventor: Donald H. Bailey, 1255 Vaughn Rd., Bloomfield Hills, Mich. 48013

[21] Appl. No.: 123,835

[22] Filed: Feb. 22, 1980

[51] Int. Cl.$^3$ .............................................. B23Q 3/00
[52] U.S. Cl. ........................ 33/174 TA; 33/174 TC; 33/DIG. 1; 269/8; 269/900
[58] Field of Search ........ 33/174 S, 174 TA, 174 TB, 33/174 TC, 174 TD, DIG. 1; 269/8, 55, 74, 81, 900

[56] References Cited

U.S. PATENT DOCUMENTS

| | | | |
|---|---|---|---|
| 2,111,299 | 3/1938 | Robbins | 33/174 S |
| 2,203,512 | 6/1940 | Wesemann | 269/8 |
| 2,324,476 | 7/1943 | Becker | 33/174 TC |
| 2,345,708 | 4/1944 | Lines | 33/174 S |
| 3,109,967 | 11/1963 | Churchill | 269/8 |
| 3,243,885 | 4/1966 | Johnson | 33/174 S |
| 3,432,934 | 3/1969 | Schmidt | 33/174 S |
| 3,736,666 | 6/1973 | Sutten | 33/174 TC |
| 3,862,498 | 1/1975 | Klucznik | 33/174 S |
| 4,073,215 | 2/1978 | Coope et al. | 269/900 |
| 4,243,213 | 1/1981 | Georgian | 269/902 |

OTHER PUBLICATIONS

Universal Vise & Tool Co., *Catalog* 1162 C J, Jun. 1964, pp. 1–22.

*Primary Examiner*—Richard R. Stearns
*Attorney, Agent, or Firm*—Basile, Weintraub & Hanlon

[57] ABSTRACT

A variety of precision tools and accessories, and precision tool sets, for selective use either individually or in relatively interconnected relation for securing a workpiece in a particular orientation for work to be performed thereon. In the precision tool sets, each of the separate precision tools is provided with a plurality of mating apertures having a pattern which matches the patterns of other mating apertures of other ones of the precision tools, thus permitting selective and interchangeable interconnection of desired ones of the precision tools by suitable fasteners received through the mating apertures. One of the basic component precision tools of such a set comprises a sine plate which may preferably include a locking strap particularly configured to avoid interference with the upper planar working surface of the sine plate. Another basic component precision tool of the set comprises a magnetic chuck adapted either for individual use or for interconnection to the sine plate or other precision tools, and provided with a bottom plate having mating apertures disposed therein. Also provided is a precision tool kit wherein at least one of the precision surfaces of the component parts of the kit is provided in relatively rough-finished form, ready for finish grinding by a user thereof.

29 Claims, 30 Drawing Figures

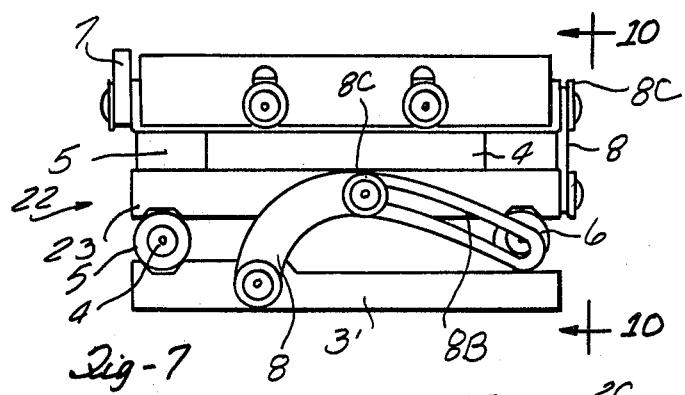
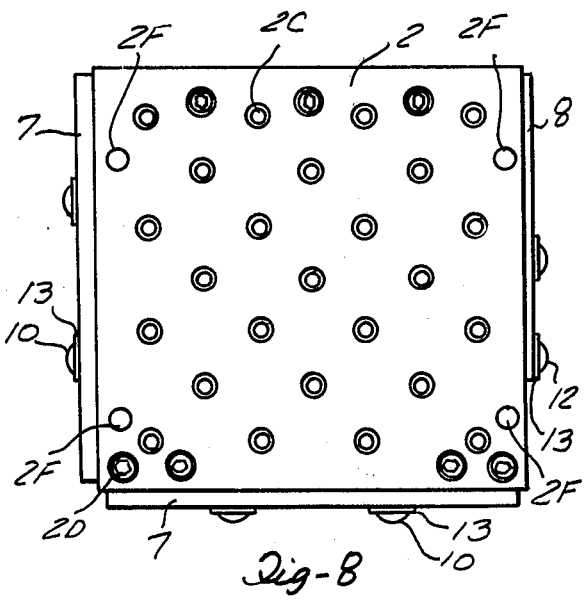
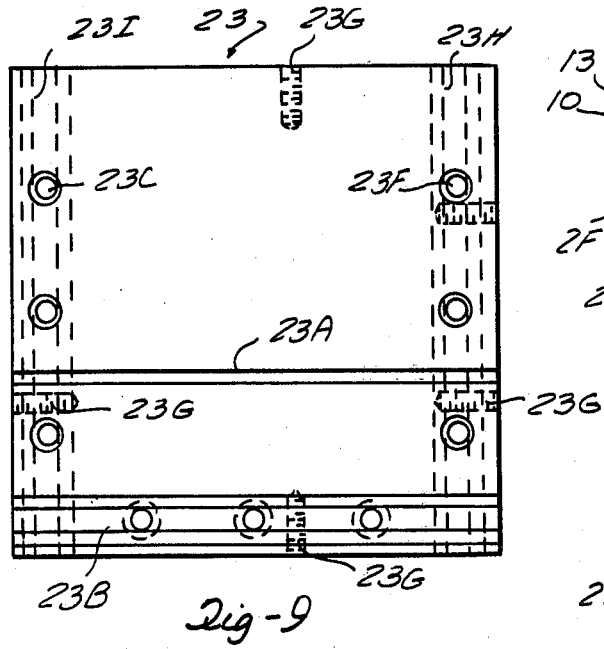
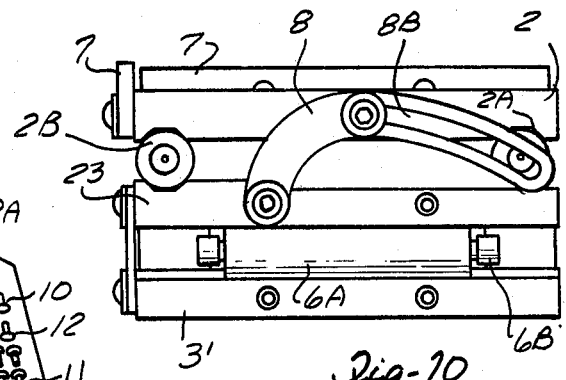
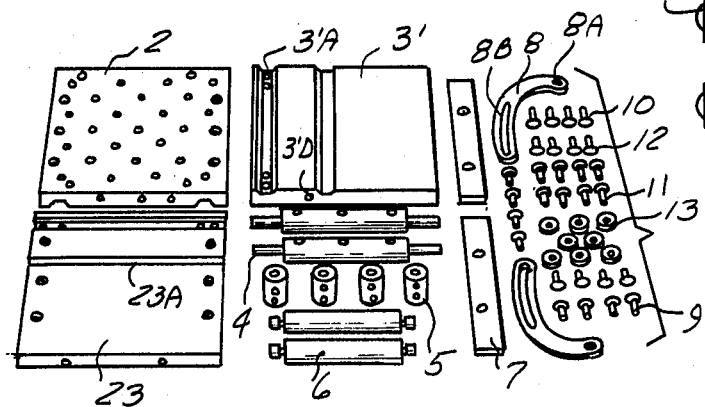

PRECISION TOOLS AND PRECISION TOOL SETS, AND METHODS OF CONSTRUCTING AND UTILIZING SAME

BACKGROUND OF THE INVENTION

1. Field of the Invention

The present invention relates generally to precision tools and accessories, and precision tool sets, for use in securing a workpiece in a particular orientation so that milling, grinding, drilling, and/or other machining work may be properly and accurately performed thereon.

More particularly, the invention relates to a plurality of individual precision tools which may be selectively employed either independently or in combination with each other so as to properly hold and orient a workpiece for the performance of work thereon by means of, for example, power-driven machines in a machine shop.

The terminology "precision tools" and "precision tool accessories" as employed herein is intended to embrace a variety of workpiece holding implements, such as, for example, sine plates, magnetic sine plates, compound sine plates, magnetic compound sine plates, sine vises, parallels, small and large precision vises, angle plates, compound angle plates, vee blocks, cubes, and indexing and non-indexing whirl-gigs; as well as a variety of other known precision tool constructions.

The terminology "machining work" as employed herein is intended to connote a variety of various finishing and shaping operations, such as milling, grinding, drilling, etc., to be accurately performed on a workpiece.

2. Description of Relevant Art

There are a great many diversified fields of production which rely upon precision tools to properly hold and orient a workpiece upon which very fine and precise finishing or shaping operations must be accurately performed to ensure precisely accurate shapes and dimensions of the finished product. Such diversified fields of production include, for example, the production of automotive parts, aircraft parts and electrical parts; as well as the production of a veritable plethora of other products which require the use of some type of machinery during the course of manufacturing operations. The precision tools and accessories are ofttimes employed not only to hold and orient a product itself, but also to hold and orient a workpiece which will ultimately be employed in machinery used for various operations in manufacturing a product. Accordingly, there has developed a very widespread need for reliable and accurate precision tools and accessories which are convenient to use and are as inexpensive as possible.

Heretofore, various disadvantages have been associated with precision tools and precision tool accessories commonly employed in machine shops. The precision tools and accessories themselves must be very precisely and accurately finished from quality materials, and are thus quite costly. Further, the expensive precision tools and accessories have heretofore been commercially available on only an individual basis, resulting in considerable expense to the purchaser if he wishes to equip his machine shop or operation sufficiently. Thus, because a substantially large number of different precision tools and accessories are required to provide the machine tool operator or other user with maximum flexibility and versatility in properly orienting and securing workpieces for work to be performed thereon, one of the major disadvantages associated with known precision tools and accessories has been the great expense involved in purchasing what would be deemed as a substantially complete set of such precision tools and accessories.

If the machine shop operator or other user is limited, in view of the aforementioned expense considerations, to only a select few of the many commercially-available expensive precision tools and accessories, there will be a resultant substantial increase in the set-up time required for performing various machining operations upon a workpiece to be shaped or finished. In this connection, it is well known that set-up time, viz., the time required for accurately orienting and securing a workpiece in a particular position for machining work to be performed thereon, ofttimes substantially exceeds the time spent in actually performing the machining work itself. Thus, if the machine tool operator or other user is poorly equipped with precision tools and accessories due to expense considerations, an inordinate amount of valuable production time will be consumed merely in setting up the workpiece for the work to be performed thereon.

Notwithstanding the foregoing, even if a particular machine shop is very well equipped with a large number of conventional precision tools and accessories, the above-discussed set-up time may still be inordinately extensive if the machine shop operator is required to accurately orient a workpiece for very particular machining work, such as grinding or drilling of compound angles, etc. Known precision tools have generally failed to provide the flexibility and versatility required to enable accurate positioning of the workpiece in a relatively short time, and have generally required the use of a large number of clamps, angle plates, etc., the positioning of which increases the set-up time required in properly orienting and securing the workpiece for machining work.

Yet another shortcoming associated with known precision tools and accessories is the possibility that such tools or accessories themselves may adversely interfere with machining operations being performed upon the workpiece oriented thereon, thus resulting in possible damage to the workpiece and/or the expensive precision tools and accessories themselves.

Illustrative of known precision tools constructions are: the "SINE PLATE ASSEMBLY" disclosed in U.S. Pat. No. 3,432,934 issued in 1969 to Schmidt; the "ADAPTOR FOR MACHINE TOOL FIXTURE" disclosed in U.S. Pat. No. 4,070,012 issued in 1978 to La Rocco; and the "ADAPTOR FOR MACHINE TOOL FIXTURE" disclosed in U.S. Pat. No. 4,153,239 issued in 1979 to La Rocco.

The present invention provides precision tools and accessories, and precision tool sets, having a variety of desirable features which effectively overcome the above-described disadvantages and shortcomings attendant known precision tools. The precision tools and precision tools sets in accordance with the invention provide maximum flexibility and versatility in orienting and holding a workpiece for machining work to be accurately performed thereon, while at the same time substantially reducing the great expense heretofore associated with known precision tools and accessories.

SUMMARY OF THE INVENTION

In accordance with a primary novel feature of the present invention, there is provided a precision tool set including a plurality of separate precision tools, each adapted for individual use in precisely orienting and securing a workpiece thereon. Each of the separate precision tools of the precision tools set is provided with a plurality of mating apertures which are particularly dimensioned and arranged so as to define a mating hole pattern adapted to permit selective and interchangeable interconnection of desired ones of the precision tools by means of fastening members received through selectively cooperating mating apertures of such desired ones of the precision tools.

In a preferred embodiment of the present invention, a precision tool set provided with the aforesaid mating apertures includes a sine plate having the top plate thereof provided with the mating apertures, and a magnetic parallel/squaring chuck including a novel bottom plate which permits independent use of the chuck, the bottom plate being provided with the mating apertures in accordance with the invention. By selectively interconnecting the sine plate and the magnetic chuck by fasteners received through the respective mating apertures thereof, the user is able to readily and conveniently provide the sine plate in accordance with the invention with a magnetic chuck. Instead of the aforesaid sine plate, or in addition thereto, the precision tool set in accordance with the invention may include a compound sine plate including the novel top plate in accordance with the invention, thus affording either a compound sine plate or a magnetic compound sine plate capacity due to the selective interconnectibility of the magnetic chuck. The precision tool set may selectively further include a sine vise having a bottom plate provided with the mating apertures in accordance with the invention, the sine vise being adapted either for individual use in precisely orienting and securing a workpiece thereon, or for use in a compound sine vise capacity merely by securing the sine vise to the top plate of the sine plate by fastening members received through relatively cooperating mating apertures of the sine vise bottom plate and the sine plate top plate.

Such preferred embodiment of the invention may also include a variety of other precision tools each adapted for individual use or for selective interconnection with other desired ones of the precision tools of the tool set in accordance with the invention, each such precision tool being provided with the mating apertures defining a mating hole pattern in accordance with the invention. Such other precision tools may comprise, for example: small and large precision vises, angle plates and compound angle plates, indexing and non-indexing whirlgigs, and other such precision tools and accessories.

In accordance with one object of the invention, there is provided a novel locking strap construction which has a predetermined arcuate configuration which ensures that the uppermost surface of the locking strap will never rise above the planar upper surface of, for example, a top sine plate, regardless of the angular position of the top plate relative to the bottom plate of the sine plate.

In accordance with another feature of the present invention, there is provided a precision tool kit which, when assembled, forms a complete precision tool; various component parts of the precision tool kit being provided in relatively rough-finished form, ready for grinding by a purchaser of the precision tool kit. It is generally contemplated that the inner and outer diameter surfaces of various component parts of the precision tool kit, as well as the dimensions and positioning of apertures, etc., be precision formed, i.e., the inner and outer diameter surfaces may be finished ground to exacting tolerance specifications such as within 0.0001 inch. Various other precision surfaces of the component parts, on the other hand, are relatively rough-finished, ready for precision grinding by a prospective purchaser to meet his own particular exacting tolerance specifications.

Various other features, objects, and details of the present invention will become apparent from the following detailed description, when read in conjunction with the accompanying drawings.

BRIEF DESCRIPTION OF THE DRAWINGS

FIG. 7 depicts a side elevational view of a compound sine plate in accordance with the invention.

FIG. 8 illustrates a top plan view of the compound sine plate of FIG. 7.

FIG. 9 is a view of the upper surface of the middle plate of the compound sine plate shown in FIG. 7.

FIG. 10 is a view of the compound sine plate taken along line 10—10 in FIG. 7.

FIG. 11 illustrates the various component parts of the compound sine plate of FIG. 7, shown in disassembled kit form.

DETAILED DESCRIPTION OF PREFERRED EMBODIMENTS

One of the basic precision tools of what might be considered a precision tool set in accordance with the present invention is provided in the form of a sine plate which is capable of accurately setting the sines of angles at minute increments so as to hold and orient a workpiece in a very precise angular position for performing machining work thereon. In accordance with the novel feature of the present invention, the sine plate may be selectively employed either in a non-magnetic sine plate capacity or in a magnetic sine plate capacity. To this end, the sine plate in accordance with the invention is adapted to interchangeably mate with a variety of other precision tools and accessories, and most particularly to mate with a novel magnetic parallel/squaring chuck. The magnetic parallel/squaring chuck of the present invention, by virtue of its capacity to be selectively secured to or removed from the sine plate of the present invention, in itself represents an important novel feature of the invention, and will be described in greater detail hereinbelow.

With reference to FIGS. 1-6, there is depicted various views of the sine plate 1 according to the present invention. The various component parts of sine plate 1 will first be described with reference to FIG. 6, which depicts the sine plate 1 in a disassembled kit form, while the relative cooperation of such component parts and the operation of the sine plate 1 will be described in detail hereinbelow with reference to FIGS. 1-15, which show the sine plate 1 in its assembled operable form.

Figure 6:
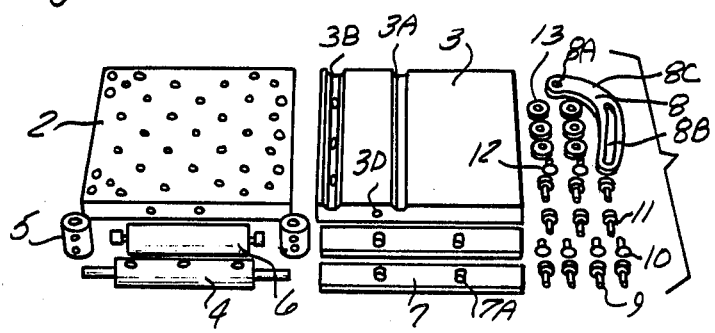
FIG. 6 illustrates the various component parts of the sine plate of FIG. 1, shown in disassembled kit form.

As shown in FIG. 6, the sine plate 1 includes a top plate 2 and a bottom plate 3 which are adapted to be joined together by means of a hinge pin assembly including a hinge pin 4 and a pair of hinge bushings 5, as will be described in detail hereinbelow. Also provided is a gage block roll 6 adapted to be secured adjacent the forward lower surface of top plate 2, and a pair of self-storing side rails 7 adapted to be selectively secured to side edges of top plate 2. A novel locking strap 8 is provided for ensuring that the top plate 2 and bottom plate 3 will be retained in a desired angular relation, as will also be described in greater detail hereinbelow.

The remaining components of the sine plate 1 as shown in FIG. 6 comprise a plurality of fastening means in the form of four socket head cap screws 9 employed for securing hinge bushings 5, four button head cap screws 10 employed for securing side rails 7, six socket head cap screws 11 employed for securing hinge pin 4 and gage block roll 6, two button head cap screws 12 employed for securing locking strap 8, and six flat washers 13. It will be understood that such fastening means are exemplary of suitable types of fasteners which may be employed for assembling sine plate 1, however, the present invention contemplates the provision of any suitable fastening members.

The particular structural features and cooperating operative relations of the various kit components of sine plate 1 as depicted in FIG. 6 will be described in detail hereinbelow with reference to FIGS. 1 through 5.

Figure 2:
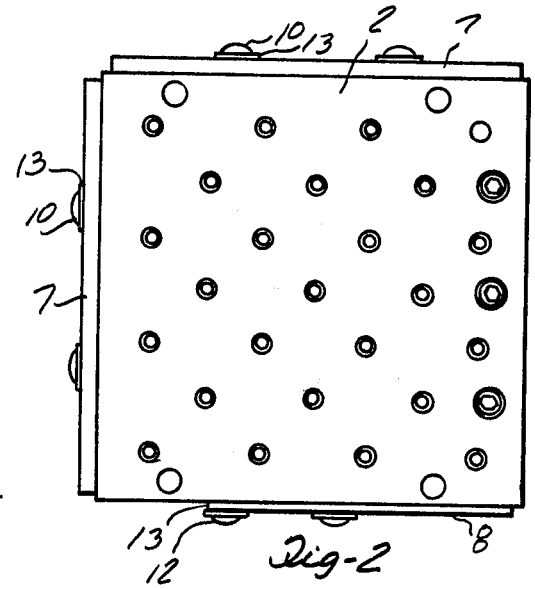
FIG. 2 illustrates a top plan view of the sine plate of FIG. 1.
Figure 3:
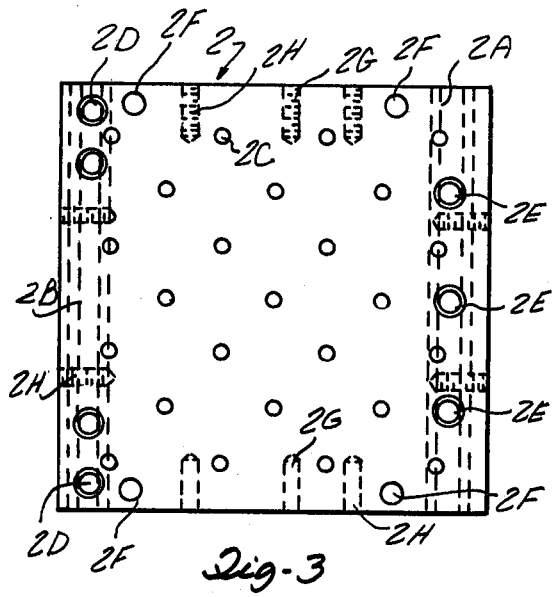
FIG. 3 is a view of the upper surface of the top plate of the sine plate of FIG. 1.

With reference to FIGS. 2 and 3, the structural features of the top plate 2, which is precision formed from hardened steel, are shown in detail. In one working embodiment of the invention, top plate 2 was formed to have a generally square configuration, with width and length dimensions of 5.94 inches. It is important to note, however, that such dimensions of top plate 2, as well as the working embodiment dimensions provided hereinbelow with reference to the various other components, are provided for exemplary purposes only, and the present invention is by no means limited in its application to such exemplary dimensions. The overall thickness dimension of top plate 2 is substantially constant, with the exception of two grooved portions 2A and 2B provided respectively at the front and rear of the lower surface of top plate 2, as shown in broken lines in FIG. 3. In the aforesaid working embodiment of the invention, the overall thickness dimension of top plate 2 was 0.69 inch, and the grooved portions 2A and 2B (each being formed with angled side walls so as to have a truncated V-shaped cross section) were 0.16 inch deep.

As shown in FIGS. 2 and 3, top plate 2 is provided with twenty-five chamfered threaded holes 2C of substantially equal size (¼ inch diameter in the working embodiment). Holes 2C are shown as provided in alternating rows of four and three holes each, however, it will be understood that the present invention is not limited to such particular number and arrangement of holes 2C. The rear row of four holes 2C and the forward row of four holes 2C (the leftmost row and the rightmost row, respectively, in FIGS. 2 and 3) do not extend entirely through top plate 2, so as to avoid any interference between fasteners inserted therein and the hinge pin 4 and gage block roll 6 to be fitted within grooved portions 2B and 2A; whereas the remaining seventeen threaded holes 2C extend entirely through top plate 2. The threaded holes 2C are particularly dimensioned and arranged in accordance with the novel feature of the invention to be described hereinbelow, and are provided for receiving fastening members for securing various precision tools and accessories to top plate 2, to thus function as mating apertures in accordance with the invention as will be described in greater detail hereinbelow.

Top plate 2 is further provided with two pairs of counterbored holes 2D extending through top plate 2 within grooved portion 2B, and three counterbored holes 2E extending through top plate 2 within grooved portion 2A. In addition, four through mating apertures 2F are disposed in substantially equidistant relationship as shown in FIGS. 2 and 3. The mating apertures 2F extend entirely through top plate 2, and are counterbored at the lower surface of top plate 2. The significance of the four mating apertures 2F will be discussed in detail hereinbelow. As also shown in FIG. 3, top plate 2 is provided with eight transversely-extending threaded bores 2H provided in equidistantly disposed pairs extending from each side edge of top plate 2, and two threaded bores 2G each disposed between opposite pairs of the threaded bores 2H.

Figure 4:
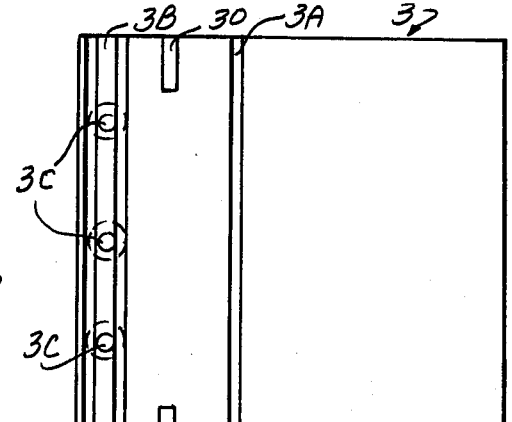
FIG. 4 depicts a top plan view of the bottom plate of the sine plate of FIG. 1.

The novel bottom plate 3 will now be described with reference to FIG. 4. Bottom plate 3 is precision formed from hardened steel and has the same width and length dimensions as top plate 2, viz., in the working embodiment bottom plate 3 had both width and length dimensions of 5.94 inches. As shown in FIGS. 4 and 6, bottom plate 3 includes a first thickness portion extending from the rear edge of bottom plate 3 to the edge of ridge 3A, and a reduced thickness portion extending from the ridge 3A to the forward edge of bottom plate 3. A rear grooved portion 3B extends across bottom plate 3 proximal to the rear edge thereof and within the aforesaid first thickness portion thereof; and three counterbored holes 3C extend through bottom plate 3 within grooved portion 3B. Also provided within the first thickness portion of bottom plate 3 is a transversely extending threaded bore 3D (FIG. 6), provided on each opposite side of bottom plate 3. The reduced thickness portion of bottom plate 3 is particularly precision dimensioned so as to compensate for the height of gage block roll 6 received within grooved portion 2A of top plate 2, as will be discussed in greater detail hereinbelow, and is formed to be entirely flat and smooth as will also be discussed in greater detail hereinbelow. In the aforesaid working embodiment of the present invention, the first thickness portion of bottom plate 3 was 0.69 inch and the reduced thickness portion was 0.554 inch, with grooved portion 3B being 0.16 inch deep.

The top plate 2 and bottom plate 3 are hingedly secured together for selective adjustment of the angular relation therebetween in the following manner. The central portion of hinge pin 4 is disposed, in part, within grooved portion 3B of plate 3 and is secured to bottom plate 3 by means of screws 11 received upwardly through holes 3C of bottom plate 3. The pair of hinge bushings 5, which are each precision formed, such as by being honed, so as to substantially tightly and slidably be received over the respective recessed end portions of hinge pin 4, are disposed over each respective recessed end of the hinge pin. The screws 9 are inserted downwardly through each of the holes 2D of top plate 2 and are secured within suitable threaded receiving apertures provided in each of the two hinge bushings 5. It will thus be understood that the arrangement of the hinge pin 4 and the hinge bushings 5 is thus partially disposed within each of the grooved portions 2B and 3B of plates 2 and 3, respectively.

The gage block roll 6 is adapted to be secured within front grooved portion 2A by means of screws 11 received downwardly through holes 2E formed in top plate 2 so as to be disposed adjacent the forward lower surface of top plate 2, and is particularly dimensioned as follows.

The gage block roll 6, having a generally cylindrical configuration, includes a central enlarged diameter portion 6A and two respective recessed end portions 6B. The main central portion 6A of gage block roll 6 is precisely dimensioned so as to be received within grooved portion 2A of top plate 2 such that, with the hinge pin arrangement secured in position as described above, the top plate 2 will be substantially precisely parallel to the bottom plate 3 when the gage block roll 6 secured within grooved portion 2A of top plate 2 is resting upon the upper surface of the forward reduced thickness portion of bottom plate 3, which is also precision dimensioned in consideration of such normal parallel relation between the top plate 2 and bottom plate 3.

The recessed end portions 6B of gage block roll 6 are precisely formed to have a predetermined dimension. The desired angular relation between the hingedly affixed top plate 2 and bottom plate 3 is conventionally set by means of precision gage blocks, such as Johansson gage blocks. A particular one (or several particular ones) of such blocks is selected by reference to an appropriate table, and is inserted in a known manner between the top and bottom plates of the sine plate such that the lower cylindrical surface of enlarged diameter portion 6A of gage block roll 6 rests upon the upper edge of the gage block, with the lower edge of the gage block being supported by the precisely flat forward reduced thickness portion of bottom plate 3. Very small precision dimensions, however, ofttimes require that the angular relation between the top and bottom plates of the sine plate be adjusted to very minute increments, on the order of only minutes of a degree. To provide precision in setting such very small minute angles, gage block sets are conventionally provided, for example, in dimensions such as 0.2001 inch, 0.2002 inch, 0.2003 inch, etc.; and ten/thousandth inch increments can thus be measured by compensating for 0.200 inch of the block by means of a special 0.200 inch deep grooved portion provided in the bottom plate of known sine plates. The gage block roll 6, however, eliminates the need for any such special grooved portion by virtue of the two recessed end portions of the gage block roll. To this end, the recessed end portions 6B of gage block roll 6 are precisely dimensioned and formed such that the distance between the lowermost point of the end portion 6B and the upper surface of bottom plate 3 is a precise predetermined measurement, such as 0.200 inch, when the top and bottom sine plates are in their normally-closed position. In the working embodiment of the invention, the enlarged diameter portion of both the hinge pin and the gage block roll were selected to be 0.7900 inch, whereas the diameter of the recessed end portions 6B of gage block roll 6 was selected to be 0.3900 inch.

With the construction of gage block roll 6 as described hereinabove, a very small precision gage block, e.g., 0.2001 inch, may be disposed between the lower surface of the recessed end 6B of gage block roll 6 and the upper surface of bottom plate 3 such that the 0.200 step provided between enlarged diameter portion 6A and recessed end portions 6B of gage block roll 6 will compensate for 0.200 inch of the block. The user is thus able to readily measure ten/thousandth inch increments in a convenient manner, without requiring any special grooved portion in the flat precision-formed reduced thickness portion of bottom plate 3 of the present invention.

Figure 1:
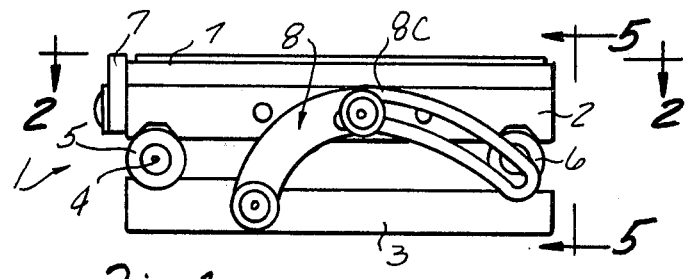
FIG. 1 depicts a side elevational view of a sine plate according to the invention.

With reference to FIG. 1, the novel locking strap 8 in accordance with the invention will now be described in detail. The locking strap 8 is formed to be flat with a constant width and thickness. Locking strap 8 has an arcuate shape particularly determined, and a fastening hole 8A and arcuate elongated slot 8B (FIG. 6) particularly disposed, such that the upper arcuate surface 8C of locking strap 8 will never rise above the planar upper surface of top plate 2. The locking strap 8 is secured to bottom plate 3 by means of one of the screws 12 (having a washer 13 disposed therearound) received through hole 8A of locking strap 8 and within threaded bore 3B of bottom plate 3. The second screw 12 (also having a washer 13 disposed therearound) is inserted through arcuate slot 8B of locking strap 8 and is threadedly received within either one of the opposite threaded bores 2G of top plate 2. In this manner, upon upward movement of top plate 2, the upper washer 13 and screw 12 will cooperate such that screw 12 slides within arcuate slot 8B of locking strap 8, while the lower washer 13 and screw 12 define a pivot point at the hole 8A of locking strap 8. The user may thus move the top plate 2 to the desired angular position relative to bottom plate 3, i.e., by employing a predetermined precision gage block as described in detail hereinabove, and such position may be securely locked by tightening the screws 12 against locking strap 8. As the top plate 2 is moved between selected angular positions relative to bottom plate 3, normally from only minutes of a single degree of up to approximately 45°, the upper arcuate surface 8C of locking strap 8 will never rise above the planar upper surface of top plate 2 due to the particular predetermined arcuate shape and dimensions of locking strap 8. Such particular shape and dimensions of locking strap 8 prevents any adverse interference with machining operations being performed upon a workpiece oriented upon sine plate 1, while at the same time ensuring that the plates 2 and 3 of sine plate 1 will be maintained in the desired angular relation. In the aforesaid working embodiment, the substantially constant width dimension of locking strap 8 was $\frac{5}{8}$ inch, while the width of slot 8B was 9/32 inch. As apparent from FIGS. 1 and 6, the radius of curvature of locking strap 8 varies along the arcuate length thereof, with the arcuate portion between hole 8A and the rearward end of slot 8B having a substantially lesser radius of curvature than the radius of curvature of the arcuate portion of strap 8 extending forwardly from the rear end of arcuate slot 8B.

Figure 5:
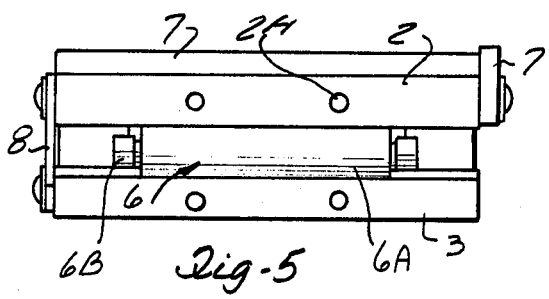
FIG. 5 is a view of the sine plate taken along line 5—5 in FIG. 1.

With reference to FIGS. 1, 2 and 5, the substantially flat elongated side rails 7 are selectively secured to desired side edges of top plate 2 by inserting one of the screws 10 (having a washer 13 disposed therearound) through each one of the pair of slots 7A of the side rail 7 and threadedly securing the screws 10 within the associated pair of threaded bores 2H provided in top plate 2. The slots 7A of side rails 7 permit selective elevational adjustment of side rails 7 to the desired height relative to the upper surface of top plate 2, depending upon the machine shop operator's needs in securing a particular workpiece. If desired, the side rails 7 may be positioned so as to extend substantially above the upper planar surface of top plate 2 as shown in FIG. 5, or may alternatively be positioned such that the upper edge of the side rail is slightly below the upper planar surface of top plate 2, in a self-storing position of side rail 7. The side rails 7 are adapted to be selectively secured to selected side edges of top plate 2, and one or more of the side rails 7 may be employed simultaneously if necessary.

The sine plate 1 as described in detail hereinabove forms a fundamental component part of the present invention in that the sine plate may be employed in combination with a variety of interchangeable precision tools and accessories as will be described in detail hereinbelow. The novel mating apertures 2F function to provide means for securing precision tools, and particularly a magnetic parallel/squaring chuck to be described below, adjacent the upper surface of top plate 2. The multiplicity of threaded holes 2C themselves comprise further mating apertures in accordance with the invention, and provide means for securing various precision tools and accessories adjacent the upper surface of top plate 2. If desired, the threaded holes 2C may also be employed for securing various precision tools and accessories to top plate 2 by means of clamps secured to top plate 2 by bolts received through the threaded holes 2C. It will be understood in this connection that the particular size and arrangement of the mating apertures 2F and threaded holes 2C as described and illustrated are merely exemplary, and such size and arrangement of the apertures and threaded holes may be altered to provide any particular mating pattern desired so as to operatively cooperate with predetermined mating hole patterns provided on other precision tools and accessories adapted for use with the sine plate 1, and forming what might be considered a precision tool set in accordance with the present invention. This particular feature of the invention, viz., a mating hole pattern provided on top plate 2 so as to mate with other component precision tools in a modular-type precision tool set, greatly increases the flexibility and versatility associated with known sine plate and other precision tool constructions, as will be understood more clearly from the following.

It will also be understood with reference to the foregoing detailed description of sine plate 1 that, although the various exemplary precision dimensions of sine plate 1 have been given in U.S. Standard measurements (inches), the sine plate 1 can alternatively be provided with metric precision dimensions, or combination metric and U.S. Standard measurements. Such selective provision of U.S. Standard measurements and/or metric measurements applies with equal vigor to the various other precision tools and accessories in accordance with the invention, which will be described in detail hereinbelow.

As described above, the top and bottom plates of sine plate 1 are formed from hardened steel, and in this regard, in the aforesaid working embodiment of the invention, the plates 2 and 3, as well as the various below-described precision tools, may be formed of steel case hardened to 0.040 to 0.060 deep for example, with a hardness of 58–60 Rockwell "C".

Figure 23:
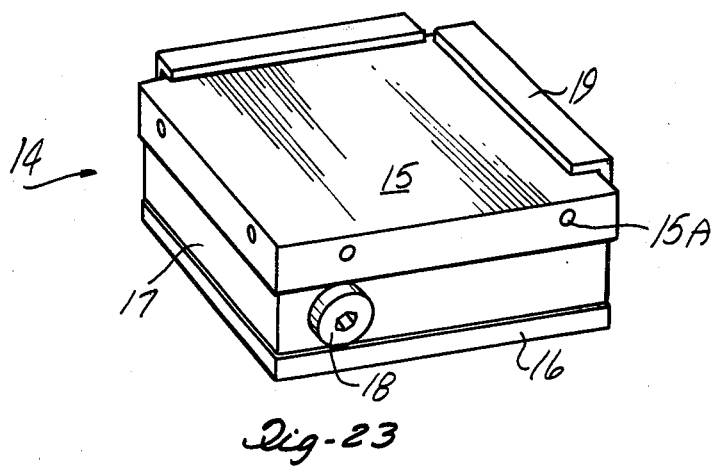
FIG. 23 depicts a perspective view of a magnetic parallel/squaring chuck in accordance with the invention.

The sine plate 1 according to the invention has been described with reference to FIGS. 1–6 in the non-magnetic sine plate capacity thereof. With reference now to FIGS. 23–27, which illustrate the novel magnetic parallel/squaring chuck in accordance with the invention, the magnetic sine plate capacity of sine plate 1 will now be described in detail. In this regard, in known sine plate constructions the sine plate is either provided as a non-magnetic sine plate, or alternatively as a magnetic sine plate having a magnetic chuck integrally mounted thereon. Such known magnetic sine plates generally comprise an integral unit, with a magnetic chuck portion being non-removably mounted on the top plate of the sine plate. Removal of the magnetic chuck portion from knowm magnetic sine plates is substantially impossible without damaging the chuck portion, due to the fact that the inner mechanisms of the chuck portion will undesirably be exposed to the ambient upon removal of the chuck portion from the sine plate portion of the magnetic sine plate. Accordingly, if a machine shop owner or other purchaser wishes to obtain the advantages of a substantially complete precision tool set including both a non-magnetic sine plate as well as a magnetic sine plate, such purchaser has theretofore been required to purchase an expensive non-magnetic sine plate as well as a separate even more expensive magnetic sine plate. In accordance with the novel features of the present invention, however, such disadvantage of known sine plate constructions is entirely overcome. To this end, the present invention provides as separate units of what may be considered a precision tool set a basic sine plate component in the form of sine plate 1 described hereinabove, as well as an entirely separate magnetic parallel/squaring chuck 14 as shown in FIG. 23. As will be understood from the following detailed description, the entirely separate chuck 14 may be readily and conveniently mounted to or removed from the sine plate 1, thus providing sine plate 1 with both a non-magnetic sine plate capacity and a magnetic sine plate capacity.

The magnetic parallel/squaring chuck 14 in accordance with the invention includes a top plate 15 formed of laminated mild and stainless steel, and a bottom plate 16 formed of hardened steel. In this embodiment of the invention, the length and width dimensions of top plate 15 and bottom plate 16 of chuck 14 are equal to the length and width dimensions of top plate 2 and bottom plate 3 of sine plate 1. Housed in a sealed manner within the housing portion 17 defined between top plate 15 and bottom plate 16 of the chuck are the internal magnetic chuck mechanisms including, for example, a ceramic permanent magnet. A handle-receiving control mechanism 18 is provided so as to selectively receive a removable handle (not shown) for providing operative control of the inner permanent magnet when necessary.

Figure 27:
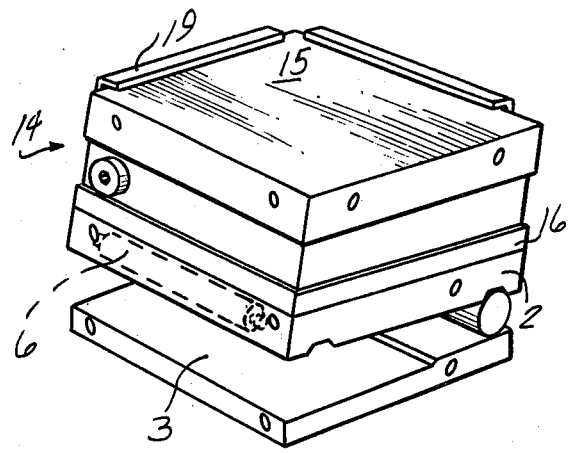
FIG. 27 is a perspective view of the chuck of FIG. 23, shown in a mounted position on the sine plate of FIG. 1.

As shown in FIGS. 23-25 and 27, the top plate 15 of chuck 14 is provided with a pair of threaded bores 15A extending inwardly from each side edge thereof. The bores 15A are adapted to receive suitable fastening means for selectively securing L-shaped rails 19 to top plate 15, as shown in FIGS. 23 and 27. By way of example, and to prevent interference with the magnetic field of chuck 14, brass bushings may be interposed between the L-shaped rails 19 and top plate 15, and it will be understood that the L-shaped rails 19 may be selectively secured to or removed from desired side edges of top plate 15, depending upon the machine operator or other user's needs in securing a workpiece upon chuck 14.

Figure 26:
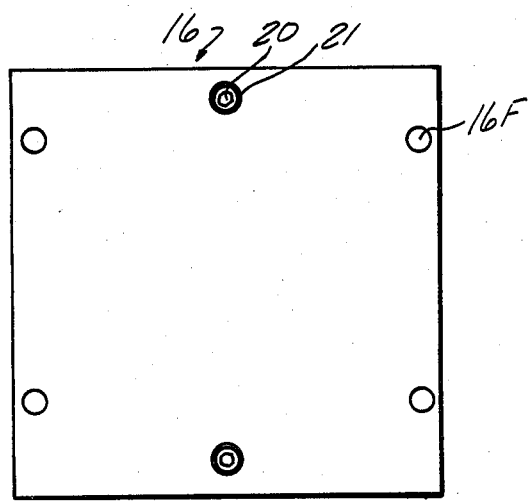
FIG. 26 is a view taken along line 26—26 in FIG. 24.

The novel bottom plate 16 of magnetic parallel/squaring chuck 14 is secured to the frame portion of chuck 14 by means of suitable fastening means, such as four screws 20 received upwardly through four suitably disposed counterbored holes 21 extending through bottom plate 16, as shown in FIG. 26. In accordance with the present invention, the bottom plate 16 is further provided with four mating apertures 16F, in the form of tapped holes which are particularly disposed and dimensioned so as to substantially precisely match with the four mating apertures 2F provided in top plate 2 of sine plate 1.

Figure 24:
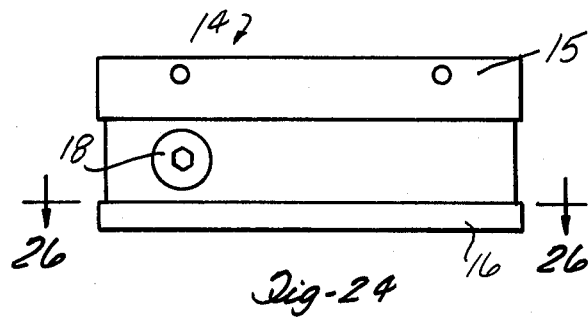
FIG. 24 illustrates a side elevational view of the chuck of FIG. 23, shown in a first operating capacity.
Figure 25:
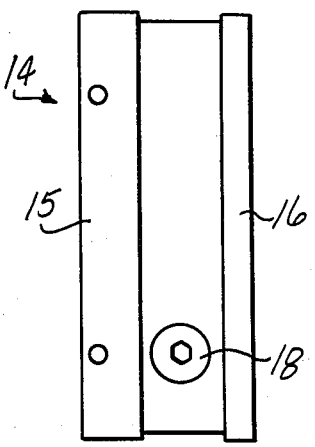
FIG. 25 depicts a side elevational view of the chuck of FIG. 23, shown in a second operating capacity.

Due to the novel construction of magnetic parallel/squaring chuck 14, the chuck may be readily employed as a separate unitary precision tool, or may be selectively employed in combination with sine plate 1 to define an overall magnetic sine plate capacity for sine plate 1. As shown in FIG. 24, one possible operating capacity of magnetic chuck 14 is afforded by employing the chuck as a separate precision tool unit, such as for use on a surface grinding machine, with the parallel planar surfaces of top plate 15 and bottom plate being disposed horizontally. As shown in FIG. 25, another possible operating capacity of magnetic chuck 14 is afforded by turning the chuck on its side for use as a separate precision tool unit (such as on a surface grinding machine), with the parallel planar surfaces of top plate 15 and bottom plate 16 being disposed vertically. Such versatility in employing chuck 14 for securing and precisely orienting a workpiece for machining work thereon is even further expanded by virtue of the fact that, due to the provision of mating apertures 16F in the chuck bottom plate 16 and cooperating mating apertures 4F in the sine top plate 2, the chuck 14 may be readily securely mounted to sine plate 1 as shown in FIG. 27.

In FIG. 27, the bottom plate 16 of chuck 14 is supported by top plate 2 of sine plate 1, and is secured thereto by suitable fastening means, such as screws, received upwardly through mating apertures 2F of top plate 2 so as to be received within mating apertures 16F of chuck bottom plate 16, and threadedly secured within the apertures 16F. The operator is thus able to readily and conveniently convert the non-magnetic sine plate 1 into the magnetic sine plate unit shown in FIG. 27, merely by securing the magnetic parallel/squaring chuck 14 in position upon sine plate 2 by means of the matched mating apertures 16F and 2F. In this regard, it will be understood that the particular location and size of mating apertures 16F and mating apertures 2F is not itself crucial within the context of the present invention, provided that the mating apertures 16F of chuck bottom plate 16 are precisely matched in size and location with the mating apertures 2F of top sine plate 2, and further provided that the number and location of the respective mating apertures are determined so as to permit the magnetic chuck to be securely held in position on the top sine plate.

It will be understood from the foregoing that only two separate components, viz., the sine plate 1 and the magnetic parallel/squaring chuck 14, will provide four different precision tool operational capacities. Such four capacities comprise: the FIG. 1 non-magnetic sine plate capacity of sine plate 1, the FIG. 27 magnetic sine plate capacity afforded by sine plate 1 interconnected with chuck 14, the FIG. 24 magnetic chuck capacity of magnetic chuck 14, and the FIG. 25 magnetic chuck capacity of chuck 14. Accordingly, in accordance with the novel features of the present invention, the substantial expense heretofore associated with the purchase of a set of precision tools and accessories is greatly diminished.

With particular regard to the mating apertures 2F and 16F of the top sine plate 2 and the magnetic chuck bottom plate 16, it will be understood that the particular orientation of each of such mating apertures, with regard to distance from the side edges of the sine plate or chuck, is selected so as to precisely match with an operatively cooperating associated one of the mating apertures of the other of the precision tools.

It is contemplated that the sine plate 1 and the magnetic parallel/squaring chuck 14 may be provided in various standard precision tool dimensions, such as, for example, substantially six inches by six inches as described hereinabove, or six inches by twelve inches, etc.

With reference to FIGS. 7-11, there is depicted a compound sine plate 22 in accordance with the present invention. It will be understood from the following description of compound sine plate 22 that the magnetic sine plate capacity of sine plate 1 described hereinabove with regard to the magnetic parallel/squaring chuck 14 is equally applicable to compound sine plate 22. In other words, the magnetic parallel/squaring chuck 14 may be interchangeably interconnected with either the sine plate 1 or with compound sine plate 22 so as to provide a magnetic sine plate capacity therefor. To this end, the top plate 2 described hereinbelow with reference to compound sine plate 22 is substantially identical to top plate 2 of sine plate 1, and is provided with a hole and aperture pattern identical to that of top plate 2. Accordingly, the magnetic parallel/squaring chuck 14 may be readily and conveniently secured to the top plate 2 of compound sine plate 22 to provide a magnetic compound sine plate capacity to compound sine plate 22, as will be more clearly understood from the following detailed description.

As shown in FIG. 11, which depicts the compound sine plate 22 in a disassembled kit form, the compound sine plate 22 includes a top plate 2 substantially identical to top plate 2 of sine plate 1. Accordingly, with regard to top plate 2, and various other substantially identical components, like reference numerals will be employed to designate like parts.

The disassembled compound sine plate kit employed for constructing compound sine plate 22 includes a pair of hinge pins 4, two pairs of hinge bushings 5, and two gage block rolls 6, all of which component parts are substantially identical to those parts described hereinabove with reference to FIGS. 1–6. The bottom plate 3' shown in FIG. 11 is substantially similar to bottom plate 3 described hereinabove with regard to sine plate 1, however, rather than the three counterbored holes 3C provided in bottom plate 3 of sine plate 1, the bottom plate 3' is alternatively provided with two pairs of counterbored holes 3'A, which will be described in greater detail hereinbelow. In all other respects, i.e., with respect to the rear grooved portion, the first thickness portion, and the reduced thickness portion thereof, the bottom plate 3' is substantially identical in shape and relative dimensions to bottom plate 3 described with regard to sine plate 1.

Regarding the middle plate 23 depicted in FIG. 11, because the upper surface thereof will ultimately perform substantially the same function as the upper surface of bottom plate 3 of sine plate 1, the middle plate 23 is substantially identical in relative dimensions to bottom plate 3 of sine plate 1 (and accordingly bottom plate 3' of sine plate 22). Thus, the middle plate 23 includes a first thickness portion extending from the rear edge thereof to the edge of ridge 23A, and a reduced thickness portion extending from the ridge 23A to the forward edge of middle plate 23. A rear grooved portion 23B, substantially identical to grooved portion 3B of bottom plate 3 of sine plate 1, is provided in the first thickness portion of the upper surface of middle plate 23, and three counterbored holes 23C extend through middle plate 23 within grooved portion 23B. Also provided in middle plate 23 are threaded bores 23G which are substantially identical to bores 2G provided in top plate 2, and relatively transversely-extending threaded bores 23J for fastening the first end of an upper locking strap 8 as will be described in detail hereinbelow. It will be further understood that the reduced thickness portion of middle plate 23 is particularly precision dimensioned so as to compensate for the height of gage block roll 6 received within grooved portion 2A of top plate 2, as described in detail hereinabove with regard to the reduced thickness portion of bottom plate 3 of sine plate 1. In this regard, the reduced thickness portion of bottom plate 3' is likewise precision dimensioned.

With further regard to middle plate 23, because the lower surface thereof will ultimately perform substantially the same function as the lower surface of top plate 2 of sine plate 1 with regard to the hinge pin assembly and gage block roll, the lower surface of middle plate 23 is provided with front and rear grooved portions 23H and 23I, respectively, as shown in phantom line in FIG. 9. The grooved portions 23H and 23I are substantially identical in configuration and relative dimensions to grooved portions 2A and 2B, respectively, described hereinabove with reference to top plate 2 of sine plate 1.

The grooved portion 23I of middle plate 23 is provided with three counterbored holes 23C, and the grooved portion 23H of middle plate 23 is provided with three counterbored holes 23E. The function of such holes 23C and 23E will be described in detail hereinbelow.

With further reference to FIG. 11, the disassembled compound sine plate kit is shown as further including a pair of side rails 7 substantially identical to side rails 7 of sine plate 1, and a pair of locking straps 8, both of which are substantially identical to locking strap 8 described with reference to sine plate 1. The fastening means shown in FIG. 11 include eight of the socket head cap screws 11, four button head cap screws 12, and eight flat washer 13, all of which are employed in much the same manner as the like-numbered fastening means described in detail hereinabove with reference to sine plate 1, and comprise exemplary suitable fastening members which may be employed in accordance with the invention.

The assembled compound sine plate 22 comprising the various component parts illustrated in kit form in FIG. 11 will now be described in detail with reference to FIGS. 7–10.

The top plate 2 and middle plate 23 are hingedly secured together for selective adjustment of the angular relation therebetween in much the same manner as top plate 2 and bottom plate 3 of sine plate 1, by means of one pair of hinge bushings 5 and one of the hinge pins 4. One of the precision-formed gage block rolls 6, including the enlarged diameter portion 6A and the recessed end portions 6B, is mounted within the front grooved portion 2A of top plate 2, as also described in detail hereinabove with regard to sine plate 1. By virtue of such arrangement of parts, the middle plate 23 will be parallel to the top plate 2 when the gage block roll 6 is resting upon the upper surface of middle plate 23.

The middle plate 23 is in turn hingedly secured to bottom plate 3' for selective adjustment of the angular relation therebetween in much the same manner as described hereinabove, except that the hinged connection between the middle and bottom plates, defined by hinge bushings 5 and hinge pin 4, will be disposed substantially perpendicular to the hinged connection defined by hinge bushings 5 and hinge pin 4 between the middle and top plates, as clearly shown in FIGS. 7 and 10. In this regard, the lower pair of hinge bushings 5 will be secured by screws 9 received upwardly through the counterbored holes 3'A of bottom plate 3', whereas the central portion of the lower hinge pin 4 will be secured by screws 11 received downwardly through counterbored holes 23C of middle plate 23. Further, the remaining one of the pair of gage block rolls 6 shown in FIG. 11 is mounted within the front grooved portion 23H provided in the lower surface of middle plate 23. By virtue of such arrangement, the middle plate 23 will be parallel to the bottom plate 3' when the lower gage block roll 6 is resting upon the upper surface of bottom plate 3'.

It will be understood from the foregoing that the precision-measurement features provided by the recessed end portions 6B of gage block rolls 6, described in detail hereinabove in connection with sine plate 1, will be afforded when employing precision gage blocks either between top plate 2 and middle plate 23 or between middle plate 23 and bottom plate 3′ due to the provision of both the upper and lower gage block rolls 6. There is thus eliminated any necessity for special grooved portions (i.e., 0.200 inch deep) in either the upper surface of middle plate 23 or the upper surface of bottom plate 3′.

The pair of locking straps 8 employed in the construction of compound sine plate 22 are substantially identical to locking strap 8 described hereinabove in connection with sine plate 1. Accordingly, due to the particular predetermined arcuate shape and particular dimensions as well as the particular disposition of fastening hole 8A and arcuate elongated slot 8B, the pair of locking straps 8 employed in constructing compound sine plate 22 prevent adverse interference with machining work being performed on a workpiece oriented on either the top plate or middle plate of compound sine plate 22. In this regard, it will be understood that, as with sine plate 1, the upper arcuate surface 8C of the upper locking strap 8 shown in FIG. 10 will never rise above the planar upper surface of top plate 2, regardless of the selected angular relation between top plate 2 and middle plate 23. The upper locking strap 8 is secured to middle plate 23 by means of one of the screws 12 (with a washer 13 disposed therearound) received through hole 8A of locking strap 8 and within threaded bore 23G of middle plate 23. A second screw 12 (with a washer 13 disposed therearound) is inserted through arcuate slot 8B of locking strap 8 and is threadedly received within one of the threaded bores 2G of top plate 2. The lower locking strap 8 (FIG. 7) is secured in much the same manner to bottom plate 3′ and middle plate 23, on a side edge portion of compound sine plate 22 which is perpendicular to the side edge portion thereof to which the upper locking strap 8 is secured.

As shown in FIGS. 7, 8 and 10, the side rails 7 may be selectively secured to desired side edges of top plate 2, in the same manner described hereinabove with regard to sine plate 1, and may be selectively elevationally adjusted relative to the top planar surface of top plate 2, also as described hereinabove.

As with the case of sine plate 1, the compound sine plate 22 forms a fundamental component part of the present invention in that the compound sine plate may be employed in combination with magnetic parallel/-squaring chuck 14, or with a variety of other interchangeable precision tools and accessories as will be described hereinbelow. To this end, the compound sine plate 22 includes the novel top plate 2 provided with mating apertures 2F which cooperatively match, in both dimensions and precisions, with the mating apertures 16F of bottom plate 16 of chuck 14. The chuck 14 is secured to top plate 2 of compound sine plate 22 in the same manner described hereinabove with reference to FIG. 27 by means of suitable fasteners, such as screws, received upwardly through mating apertures 2F of top plate 2 so as to be threadedly received within mating apertures 16F of chuck bottom plate 16. The compound sine plate 22 is thus readily and conveniently converted from the non-magnetic compound sine plate capacity shown in FIGS. 7 and 10 into a magnetic compound sine plate unit, merely by securing the matnetic parallel/squaring chuck 14 in position upon top plate 2 of compound sine plate 22 by means of the matched mating apertures 16F and 2F. Again, the particular location and size of the mating apertures 16F and 2F is not particularly crucial within the context of the present invention, provided that the two sets of mating apertures are matched in relative size and location and a sufficient number of the mating apertures are suitably located so as to provide secure holding of the matnetic chuck in position on the top sine plate.

It will be understood from the foregoing that, in what might be considered a novel set of precision tools in accordance with the invention, whereas the sine plate 1 and magnetic chuck 14 together provide at least four precision tool capacities as described hereinabove, the addition of compound sine plate 22 to such a set provides at least two additional precision tool capacities. The compound sine plate 22 may be employed separately as a precision tool in the capacity of a non-magnetic compound sine plate which provides the ability to measure minute compound angles for precisely orienting a workpiece for work thereon, by virtue of the relative perpendicular hinged arrangement of the bottom plate and middle plate on the one hand and the middle plate and top plate on the other hand. Such capacity for measuring minute compound angles may be readily converted to a magnetic compound sine plate capacity merely by securing the magnetic parallel/-squaring chuck 14 on the top plate 2 of compound sine plate 22, thus defining an additional precision tool capacity. As will be understood from the following, and similar to sine plate 1, the compound sine plate 22 may also be readily interconnected with other interchangeable precision tools in accordance with the invention.

Hereagain, as with the sine plate 1, the compound sine plate 22 (as well as magnetic chuck 14) may be selectively provided with U.S. Standard measurements and/or metric measurements.

Figure 18:
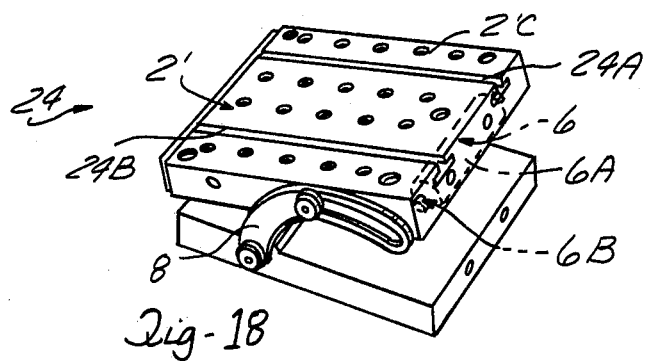
FIG. 18 is a perspective view of a sine plate having "T" slots formed therein in accordance with the invention.
Figures 19, 20:
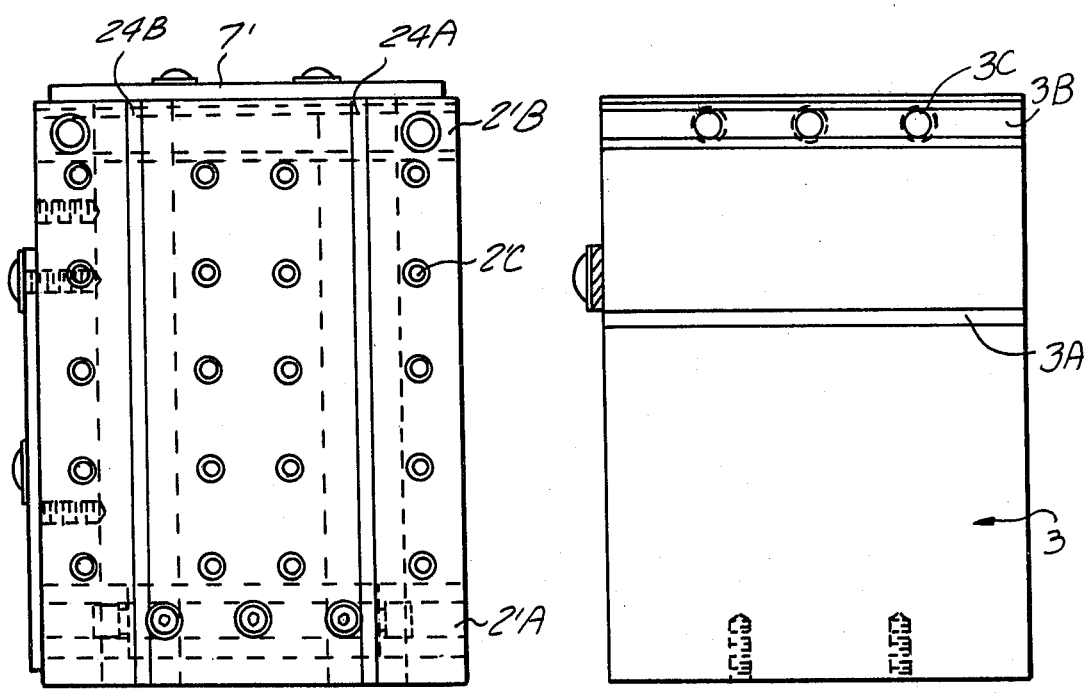
FIG. 19 depicts a top plan view of the sine plate shown in FIG. 18.
FIG. 20 illustrates a top plan view of the bottom plate of the sine plate shown in FIG. 18.

With reference now to FIGS. 18–20, there is shown a second embodiment of a sine plate 24 which is substantially identical in many respects to sine plate 1, except that sine plate 24 includes a top plate 2′ provided with two elongated parallel "T" slots in the upper portion thereof. In other respects, the top plate 2′ of sine plate 24 is substantially identical to top plate 2 of sine plate 1, and includes front and rear lower grooved portions 2′A and 2′B respectively for mounting gage block roll 6 and the hinge assembly 4, 5, respectively. The bottom plate 3 of sine plate 24 is identical to bottom plate 3 of sine plate 1, and includes a first thickness portion and a reduced thickness portion, the reduced thickness portion being precision dimensioned in consideration of the mounted height of gage block roll 6, as described hereinabove. The sine plate 24 is provided with a gage block roll 6 including enlarged diameter portion 6A and precision recessed end portions 6B which is identical to precision gage block roll 6 described in detail hereinabove. With the lower surface of the enlarged diameter portion of gage block roll 6 resting upon the upper surface of bottom plate 3, the top and bottom plates of sine plate 24 will be precisely parallel, as also described above, and as in the foregoing embodiments the structure of gage block roll 6 eliminates any need for a special 0.200 inch precision gage block groove in bottom plate 3. The locking strap 8 shown in FIG. 18 is secured to sine plate 24 in the same manner as described hereinabove with regard to sine plate 1, and is identical to locking strap 8 described in detail above with regard to the particular predetermined arcuate configuration and dimensions thereof. Thus, as in the previous embodiments, the locking strap 8 will never rise above the upper planar surface of top plate 2', thus avoiding any adverse intereference with machining work being performed on a workpiece oriented on top plate 2'. The self-storing side rail 7' is substantially similar to side rails 7 described in detail hereinabove, and may be selectively mounted adjacent desired edge portions of top plate 2'.

The pair of "T" slots 24A and 24B provided in the upper portion of top plate 2' permit the positioning and securing of a workpiece upon top plate 2' by means of "T" bolts, such as ¼ inch "T" bolts. The top plate 2' is also provided with an arrangement of threaded holes 2'C similar to threaded holes 2C of top plate 2, which provide mating aperture means for securing other precision tools to top plate 2', or means for securing workpieces directly to top plate 2' such as by means of clamps secured by bolts received in threaded holes 2'C.

It will be understood from the foregoing that the novel locking strap and the gage block roll provided in the sine plate 1 embodiment of the invention are also employed in sine plate 24, thus affording sine plate 24 with the same advantages discussed hereinabove with regard to sine plate 1. Further, the provision of holes 2'C, which may be disposed in any desired suitable arrangement as described hereinabove with regard to sine plate 1, permit the selective interconnection of other precision tools provided with mating hole patterns to the top sine plate 2'. Accordingly, the sine plate 24 may be employed as another component of what might be considered a set of precision tools and accessories having the predetermined mating hole pattern feature of the present invention. Although not shown, it is further contemplated that top plate 2' of sine plate 24 may be provided with mating apertures similar to mating apertures 2F of top plate 2 of sine plate 1 so as to permit selective interconnection of magnetic chuck 14 to sine plate 24, for example.

As in the foregoing embodiments, sine plate 24 may be selectively provided with U.S. Standard and/or metric measurements.

With reference now to FIGS. 12-17, there will now be described two additional precision tools, in the form of a sine vise 25 and a small precision vise 25', which comprise two additional components of what might be considered a set of precision tools and accessories in accordance with one preferred embodiment of the invention. It will be understood from the following, however, that the sine vise 25 and the small precision vise 25' both comprise separate independent precision tools, which tools may be selectively employed either independently or in combination with various of the other above-described precision tools in accordance with the invention.

Figure 15:
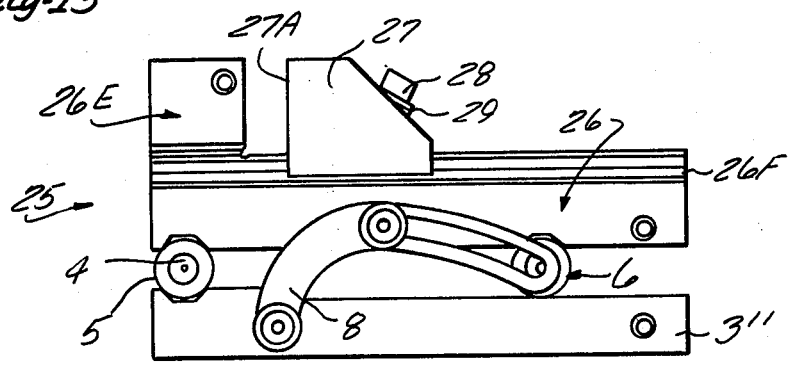
FIG. 15 illustrates a side elevational view of a sine vise in accordance with the invention.
Figure 16:
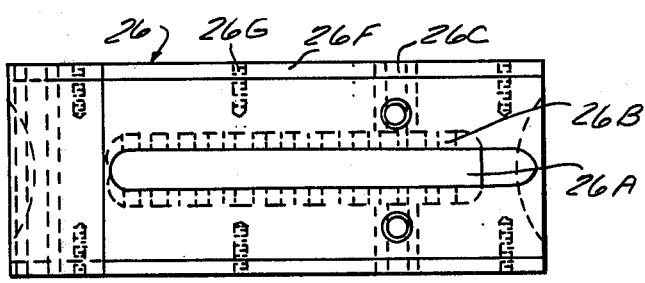
FIG. 16 depicts a top view of the vise body of the sine vise shown in FIG. 15.
Figure 17:
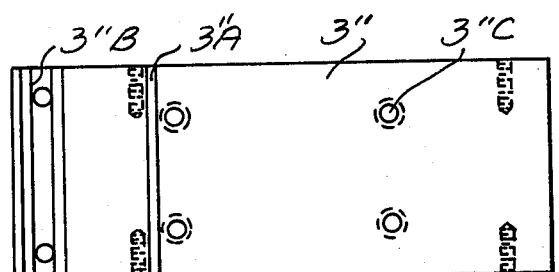
FIG. 17 is a top plan view of the bottom plate of the sine vise shown in FIG. 15.

As shown in FIGS. 15-17, the sine vise 25 in accordance with the invention includes a bottom plate 3", an upper vise body 26 having an integral upwardly-extending fixed jaw portion 26E, and an adjustable jaw 27 slidably received on opposite track portions 26F of vise body 26. The vise body 26 and bottom plate 3" are hingedly secured together for relative angular adjustment therebetween in much the same manner as described hereinabove with regard to top plate 2 and bottom plate 3 of sine plate 1.

With reference to FIG. 17, the bottom plate 3" is shown as having a general configuration substantially the same as that of bottom plate 3 of sine plate 1. In this regard, bottom plate 3" includes a first thickness portion defined between the rear edge thereof and the edge of ridge 3"A and having a grooved portion 3"B formed therein; and a precision formed flat reduced thickness portion defined between the ridge 3"A and the forward edge of bottom plate 3". As described in detail with reference to bottom plate 3 of sine plate 1, the reduced thickness portion of bottom plate 3" is particularly precision dimensioned so as to compensate for the height of a gage block roll 6 received within a grooved portion 26C of vise body 26. The upper surface of the reduced thickness portion of bottom plate 3" will serve as a support surface for a precision gage block in the same manner as described above with reference to bottom plate 3. The upper grooved portion 3"B of bottom plate 3" is substantially similar to grooved portion 3B of plate 3, and two threaded bores 3"D are provided which are substantially similar to threaded bores 3D of bottom plate 3. In addition, the bottom plate 3" is provided with four counterbored mating apertures 3"C extending through the reduced thickness portion thereof. The significance of the mating apertures 3"C will be described in detail hereinbelow.

It will be understood from the following that vise body 26 of sine vise 25 is substantially identical to vise body 26' of small precision vise 25', except that the lower surface of vise body 26 of sine vise 25 is provided with front and rear grooved portions 26C and 26D, respectively, whereas the lower surface of vise body 26' of small precision vise 25' is substantially flat and smooth. In the following, those parts of small precision vise 25' which are substantially identical to corresponding like parts of sine vise 25 have been designated by like reference numerals followed by a prime symbol.

The vise body 26 includes a substantially flat plate portion provided with the opposite track portions 26F, from which upwardly extends an integral rearwardly-disposed fixed jaw portion 26E. As shown in FIG. 16, the plate portion of vise body 26 is provided with a longitudinally disposed elongated slot 26A. The lower peripheral longitudinal opposite edges of slot 26A are each provided with a ridged track portion 26B defined by a series of concave recesses (as shown at 26'B in FIG. 14). The lower surface of vise body 26 is provided with a front grooved portion 26C and a rear grooved portion 26D, which are respectively substantially identical in general configuration to front grooved portion 2A and rear grooved portion 2B of top plate 2 of sine plate 1. It will be understood that the lower planar surface of vise body 26, with the exception of grooved portions 26C and 26D and the slotted portion, is precisely smooth and flat.

Figure 14:
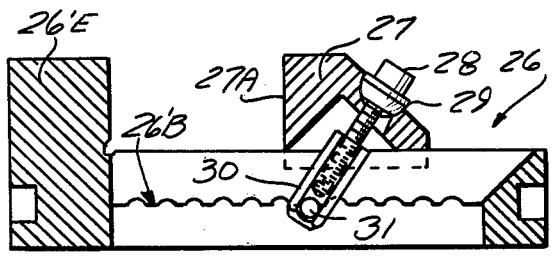
FIG. 14. depicts a side view, partly in section, of the vise body and operatively cooperating adjustable jaw of the small precision vise shown in FIG. 12.

With reference to FIGS. 14 and 15, the adjustable jaw 27, slidably disposed on vise body 26 as described above, is provided with an oblique upper surface having an aperture within which is disposed a swivel washer 29. A socket head cap screw 28 is obliquely received through swivel washer 29 and threadedly engages a draw bar 30 having a transversely extending dowel 31 mounted adjacent the lower end thereof. Sliding adjustment of adjustable jaw 27 along vise body 26 is effected by loosening screw 28 so as to lower draw bar 30 such that dowel 31 is released from engagement with ridged track 26B (or 26'B); sliding adjustable jaw 27 to the desired position along vise body 26; and thereafter tightening screw 28 such that the dowel 31 of draw bar 30 is raised into secure engagement within corresponding opposite ones of the concavities defining the opposite portions of ridged track 26B. As shown in FIG. 14, the forward end portion of vise body 26 (or 26') includes an angled surface S extending upwardly to define the forward end of slot 26A. Such angled surface S operatively cooperates with the similarly angled arrangement of screw 28 and draw bar 30 to expand the forwardmost positioning limit of adjustable jaw 27 on vise body 26.

As shown in FIG. 15, the rearward substantially vertical surface 27A of adjustable jaw 27 operatively cooperates with the forward substantially vertical surface of fixed jaw portion 26E of vise body 26 so as to securely orient and hold a workpiece therebetween for performing desired accurate machining work on the workpiece, selective adjustment between such respective work-engaging surfaces being afforded by means of screw 28 (and draw bar 30) as described hereinabove.

The vise body 26 of sine vise 25 is hingedly secured to the bottom plate 3" to permit precise and minute angular adjustment therebetween in much the same manner as described hereinabove with regard to sine plate 1. The central portion of hinge pin 4 is disposed, in part, within grooved portion 26D of vise body 26 and is secured to vise body 26 by means of suitable fasteners, such as screws, received upwardly through suitable apertures provided in the central portion of hinge pin 4 so as to be secured within the pair of threaded holes provided in the grooved portion 26D (FIG. 16). A pair of hinge bushings 5, disposed over respective recessed ends of hinge pin 4, are in turn secured to bottom plate 3" by means of suitable fasteners, such as screws, received upwardly through the apertures provided in grooved portion 3"B of bottom plate 3" (FIG. 17) so as to be secured to hinge bushings 5. The arrangement of hinge pin 4 and hinge bushings 5 will thus be partially disposed within each of the grooved portions 26D and 3"B of vise body 26 and bottom plate 3", respectively.

A gage block roll 6, having substantially the same configuration as gage block roll 6 described above, and including precision formed recessed end portions 6B and enlarged central portion 6A, is mounted within forward grooved portion 26C of vise body 26 (FIG. 15). Thus, the sine vise 25 is provided with the same precision-measurement features afforded by the recessed end portions 6B of gage block roll 6 as described in detail hereinabove with regard to sine plate 1. Any need for a special compensating grooved portion for use in connection with precision gage blocks to measure very minute angles is thus eliminated in the construction of sine vise 25.

It will be understood that the particular dimensions of hinge bushings 5, hinge pin 4 and gage block roll 6 of sine vise 25 are determined in consideration of the dimensions of sine vise 25, and accordingly the length of both the hinge pin 4 and gage block roll 6 will be determined in accordance with the relative width dimension of sine vise 25. In one working embodiment of sine vise 25, the vise body 26 and bottom plate 3" each had length dimensions of 7.5 inches, and width dimensions of 2.94 inches.

A locking strap 8, in accordance with the features of the invention as described in detail above, is secured to bottom plate 3" (via threaded bore 3"D) and vise body 26 (via threaded bore 26G) in substantially the same manner as described above with regard to sine plate 1.

It will be understood from the foregoing detailed description of sine vise 25 that the sine vise 25 is provided with the same novel features with regard to locking strap 8, and the same features of gage block roll 6, as described above with regard to sine plate 1. Although the sine vise 25 as thus constructed comprises a separate and independent precision tool in and of itself, the sine vise 25 is further provided with the novel mating aperture feature of the present invention, thus rendering sine vise 25 compatible with other component precision tool parts of what might be considered a precision tool set in accordance with the invention. To this end, as shown in FIG. 17, the bottom plate 3" of sine vise 25 is provided with a plurality of counterbored threaded mating apertures 3"C. The mating apertures 3"C, four of which are shown in FIG. 17, are particularly disposed and sized so as to match with the pattern of threaded holes 2C provided in top plate 2 of sine plate 1 as described in detail above. In other words, with reference to FIG. 17 as well as FIG. 3, the four mating apertures 3"C are particularly spaced such that they will match and align with various sets of four of the threaded holes 2C of top sine plate 2 which define a corresponding rectangular hole pattern. Such mating hole patterns between the mating apertures 3"C and the holes 2C permit the selective positioning and securing of sine vise 25 on top sine plate 2 in a multiplicity of positions. For example, such mating hole patterns permit the securing of sine vise 25 to top sine plate 2 adjacent each corner of sine plate 2 from either direction, viz., in eight different corner-mounted orientations, whereby the sine vise 25 may be secured so as to be disposed adjacent two suitably arranged side rails 7, thus ensuring a precisely square and parallel arrangement of sine vise 25 on sine plate 1. Alternatively, the sine vise 25 may be secured (via mating apertures 3"C and the matching hole pattern of holes 2C) in a substantially central position on top sine plate 2, or any other of the various desired positions afforded by virtue of such matching hole patterns. Securing of sine vise 25 in position on sine plate 1 is accomplished by means of suitable fastening means, such as screws, received through mating apertures or holes 2C of top sine plate 2, thereby eliminating the need for auxiliary clamps for mounting sine vise 25.

It will be understood that, in accordance with the novel features of the present invention, the mating hole patterns described above with regard to mating apertures 3" and holes 2C is in no manner restricted to the particular illustrated embodiment, and indeed any number of various mating hole patterns may be provided within the context of the present invention, provided of course that the relative positioning and dimensions of the mating apertures 3"C match with the hole patterns of various ones of the holes 2C of top sine plate 2. In this regard, it will also be understood that the holes 2C of top plate 2 of sine plate 1 themselves define mating apertures in accordance with the features of the invention.

By securing sine vise 25 to sine plate 1 as described above, the user is able to readily and conveniently combine the sine plate 1 and the sine vise 25 so as to form an overall compound sine vise capacity. Thus, in addition to the various multiple-capacity precision tools described hereinabove, the sine vise 25 itself defines yet another multiple-capacity precision tool which may be provided in what might be considered a precision tool set in accordance with the invention.

Figure 12:
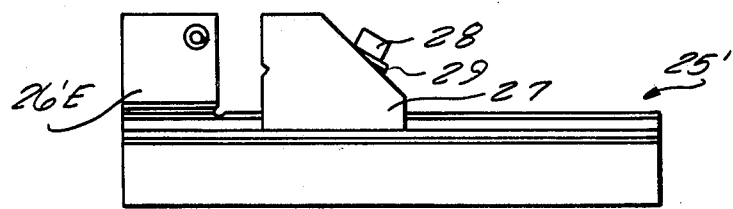
FIG. 12 depicts a side elevational view of a small precision vise according to the invention.
Figure 13:
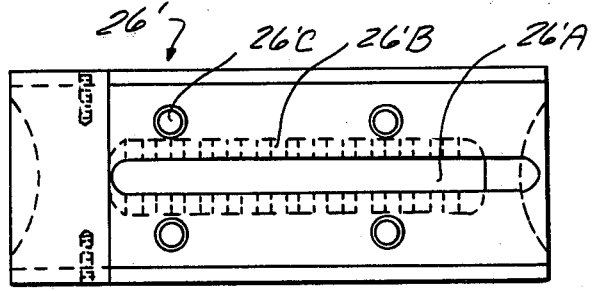
FIG. 13 illustrates a top view of the vise body of the small precision vise shown in FIG. 12.

With regard to the small precision vise 25' shown in FIGS. 12–14, the structural features of which are substantially identical to vise body 26 of sine vise 25 except that no grooved portions 26C and 26D are provided, and the plate portion of vise body 26' is provided with four counterbored threaded mating apertures 26'C as shown in FIG. 13. Such mating apertures 26'C correspond in function and configuration to mating apertures 3"C of bottom plate 3" of sine vise 25. Accordingly, it will be understood that the small precision vise 25' is also provided with multiple capacities in accordance with the novel mating aperture feature of the present invention. In this regard, small precision vise 25' may be employed independently as a separate precision tool, or may be readily secured to top plate 2 of sine plate 1 via suitable fastening means received through holes 2C and mating apertures 26'C. Such matching holes pattern applies with equal vigor to compound sine plate 22, and accordingly the precision vise 25' may be readily and conveniently secured to top plate 2 of compound sine plate 22, via suitable fastening means received through mating apertures 26'C and holes 2C. Accordingly, it will be understood that, by securing precision vise 25' to sine plate 1, one is afforded with an overall sine vise capacity; and by selectively securing precision vise 25' to compound sine plate 22, one is afforded with an overall compound sine vise capacity. Thus, precision vise 25' itself defines yet another multiple-capacity precision tool which may be selectively provided in what might be considered a modular and interchangeable precision tool set in accordance with the present invention, and is also capable of being employed independently as a separate precision tool.

Figures 21, 22:
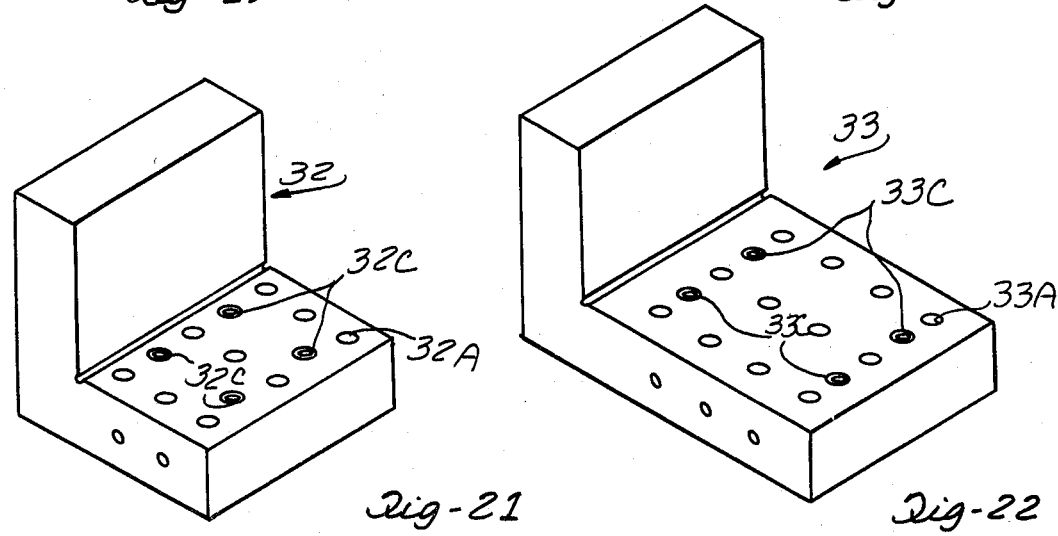
FIG. 21 depicts a perspective view of a small angle plate in accordance with the invention.
FIG. 22 illustrates a perspective view of a large angle plate in accordance with the invention.

With reference to FIGS. 21 and 22, there will now be described an angle plate 32 and an angle plate 33 in accordance with the invention. Each of the angle plates 32 and 33 comprise precision formed right-angle configuration angle plates, each of the perpendicular portions of which are formed of hardened steel. Each of the angle plates 32 and 33 are shown as being provided in the base plate portion thereof with a plurality of tapped holes 32A and 33A, respectively, and although nine of such holes 32A and 33A are illustrated, it will be understood that the number and arrangement of such holes are shown for exemplary purposes only, and any desired number or arrangement thereof may be provided in accordance with the invention. The holes 32A and 33A are particularly useful in securing workpieces to the angle plates 32 or 33, such as for receiving suitable fastening means for clamps, etc. In this regard, it will be understood that the angle plate 33, which has substantially larger dimensions than the smaller angle plate 32, is particularly useful for mounting small workpieces thereon for inspection and layout operations, for example.

As shown in FIGS. 21 and 22, the base plate portions of each of the angle plates 32 and 33 are provided with mating apertures 32C and 33C respectively, such apertures being substantially identical in function to the various other mating apertures described in detail hereinabove in that they are particularly oriented and dimensioned so as to match the hole patterns of the holes 2C in sine plate 1 and compound sine plate 22. Accordingly, each of the angle plates 32 and 33 may be readily secured to the top plate of either sine plate 1 or compound sine plate 22 by means of suitable fasteners secured through mating apertures 32C, 33C and corresponding holes 2C of sine plate 1 or 22. Each of the angle plates 32 and 33 is thus provided with a multiple precision tool capacity in that they may be selectively employed either by securing same to one of the sine plates 1 or 22, or alternatively by employing same independently to hold a workpiece in a particular orientation. Hereagain, the provision of mating apertures 32C and 33C, having a hole pattern which generally corresponds in spacing and dimensions to the hole pattern of various holes 2C in the sine plates, eliminates the need for auxiliary clamps in securing the angle plates to the sine plate or compound sine plate. The angles plates 32 and 33 thus comprise yet further multiple-capacity precision tools of what might be considered a modular precision tool set in accordance with the features of the present invention.

Figure 28:
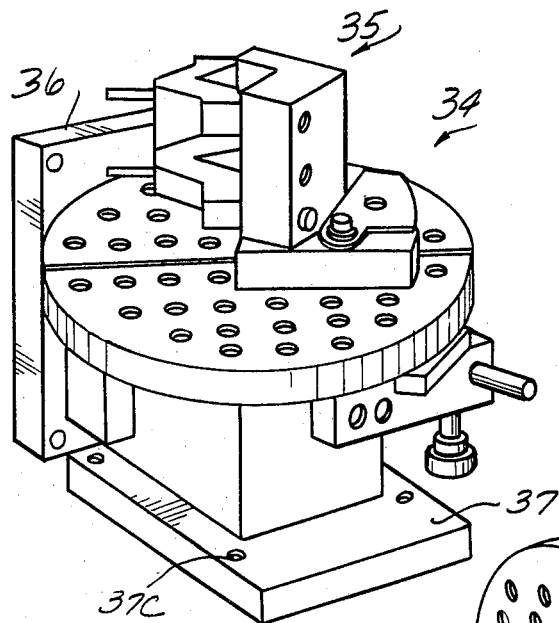
FIG. 28 depicts a perspective view of a non-indexing whirl-gig in accordance with the invention.
Figure 29:
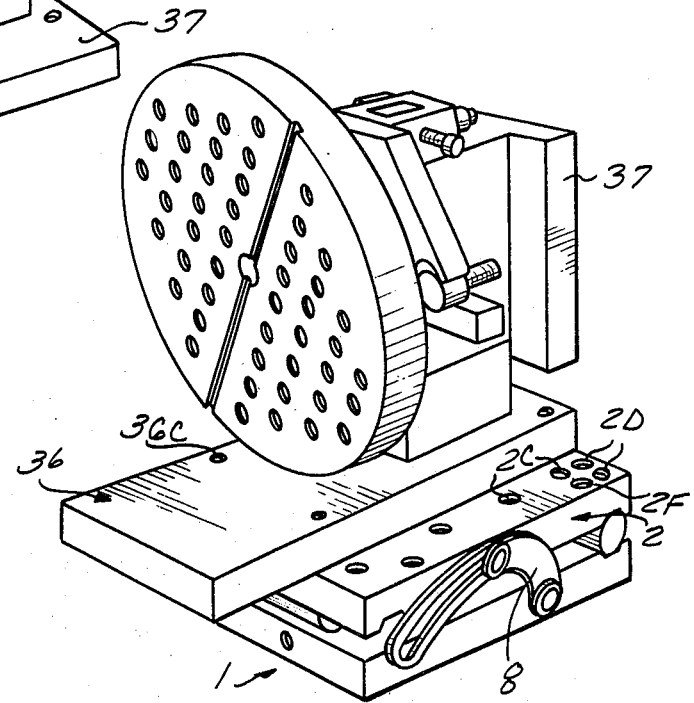
FIG. 29 illustrates a perspective view of the non-indexing whirl-gig of FIG. 28, shown in a mounted position on the sine plate of FIG. 1.
Figure 30:
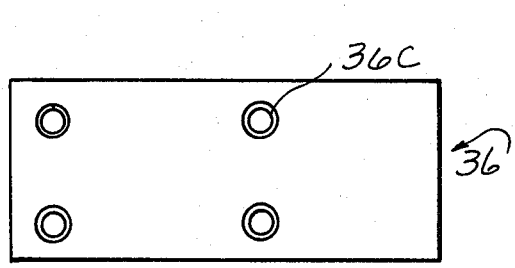
FIG. 30 depicts a bottom plan view of the base plate of the whirl-gig of FIG. 28.

With reference to FIGS. 28-30, there is illustrated a non-indexing whirl-gig precision tool in accordance with the present invention. The whirl-gig 34 is provided with a selectively mountable vee block and clamp arrangement 35, a base or mounting plate 36, and a plate 37. The whirl-gig 34 is generally employed for grinding convex and concave radii, either on center or eccentrically, in a workpiece oriented thereon and secured thereto. In general, workpieces held in the vee-block arrangement 35 are turned so as to create a desired radius. The plates 36 and 37 are precision formed from hardened steel, and as shown most clearly in FIG. 30 the plate 36 of whirl-gig 34 is provided with four mating apertures 36C which are particularly dimensioned and arranged so as to precisely mate with the hole pattern of various ones of the holes 2C of sine plate 1. Accordingly, as in the foregoing embodiments of the invention, the whirl-gig 34 may be readily secured to the top plate 2 of sine plate 1 by means of suitable fasteners received through the mating apertures 36C and the holes or mating apertures 2C of sine plate 1. The whirl-gig 34 may selectively be employed either as a separate and independent tool, may be mounted to a magnetic chuck, or may be readily and conveniently mounted to sine plate 1 via mating apertures 36C and 2C which prevent any need for employing auxiliary clamps. The whirl-gig 34 thus comprises yet another multiple-capacity precision tool of what may be considered a modular precision tool set in accordance with the invention, wherein each precision tool is provided with the above-described mating hole pattern or patterns. Hereagain, it should be understood that the particular arrangement of mating apertures 36C may be varied as desired, provided of course that the hole pattern thereof precisely mates with the hole pattern of various of the holes 2C provided in sine plate 1. As shown in FIG. 28, it is further contemplated that, if desired, plate 37 may be provided with novel mating apertures 37C according to the invention.

Although there have been described in detail hereinabove a variety of precision tools in accordance with the present invention which may each be selectively employed either independently or may be considered as a component part of a modular precision tool set in accordance with the invention, it will be understood that the novel features of the present invention may be embraced within a wide variety of other different precision tools. It is contemplated, for example, that parallels, large precision vises, V-shaped jaw vises, compound angle plates, vee blocks, cubes, indexing whirl-gigs, and various other known precision tool constructions not specifically described in detail may also be provided with the novel mating aperture feature of the present invention.

In general, the novel mating aperture feature of the present invention, the novel sine plate and compound sine plate construction including locking strap 8 and the novel magnetic parallel/squaring chuck construction of the present invention provide a novel modular precision tool set concept wherein each component part or individual precision tool is provided with a multiple precision tool capacity. Such concept provides a prospective purchaser with a vastly more versatile and efficient precision tool capacity, afforded by a minimal number of separate precision tools, than has heretofore been possible with known commercially-available precision tools. In addition to the substantial expense reduction and enhanced utility provided by the novel mating aperture feature, such feature also effectively eliminates the necessity of employing auxiliary clamping means in mounting one precision tool of the set to another. Moreover, however, such mating aperture feature of the various precision tools according to the invention affords substantially enhanced versatility in combining various selected ones of the precision tools so as to substantially reduce the required set-up time for orienting and securing a workpiece for a variety of accurate milling, grinding, drilling and/or other machining operations to be performed on the workpiece.

Another important novel feature of the present invention will now be described with reference to each of the precision tools described in detail hereinabove with reference to FIGS. 1–30, as well as the various other precision tools mentioned above. Such novel feature resides in the production of each such precision tool in semi-finished form, insofar as at least some of the precision formed surfaces of the tool are concerned. In this regard, whereas known precision tools have heretofore been provided with each precision surface thereof finished to exacting tolerance specifications which increases the cost of the tools, the present invention contemplates the provision of precision tools in substantially a "do-it-yourself" kit form with regard to finishing precision surface to exacting tolerance specifications of a particular user or purchaser. It is particularly contemplated, for example, that whereas substantially all inner diameter and outer diameter finishing work associated with various component parts of the precision tools, such as the outer diameter dimensions of gage block roll 6, is performed so as to be finished ground to exacting tolerance specifications such as within 0.0001 inch, for example; while other precision surfaces of the precision tool components of the kit are only relatively rough-finished ground to a tolerance of within 0.01 or 0.02 inch, for example. Thus, a prospective purchaser of such a precision tool kit would employ his own surface grinder to precision finish grind the relatively rough-finished surfaces to meet that particular user's own exacting tolerance specifications.

By way of example, attention is directed to FIGS. 6 and 11 which respectively illustrate the sine plate 1 and compound sine plate 22 in disassembled kit form. In accordance with the foregoing semi-finished feature of the invention, the precision upper surface of, for example, the top sine plate 2, would be provided in semi-finished form by being only relatively rough finished machined or ground to within 0.01 or 0.02 inch, for example. As set forth above, inner and outer diameter finishing work, such as with regard to gage block roll 6, would meet exacting tolerance specifications, such as within 0.0001 inch. Accordingly, it would remain for a prospective purchaser of either of the disassembled kits to finish grind the semi-finished upper surface of top plate 2, or any other semi-finished surface which may be provided, to within the purchaser's own particular exacting tolerance specifications, if necessary, and to assemble the kit to form the sine plate and/or compound sine plate construction described in detail hereinabove. In this regard, it will be understood that in all other respects the component parts of such disassembled kits would be precision formed as described hereinabove, such as with regard to mating hole patterns, etc., with all major components thereof being formed of fully case hardened steel, ready for any finish grinding which may be required.

In accordance with the foregoing semi-finished feature of the invention, production of the component parts of the precision tools or precision tool kits is facilitated to the extent that the purchaser will realize a substantial savings in expense by purchasing the tool or tool kit and thereafter performing the above-described exacting finish grinding work which may be necessary within his own machine shop. Further, such semi-finished form of various ones of the precision surfaces of the precision tools will permit the purchaser or other user to custom finish grind such surfaces in consideration of his own particular exacting tolerance specifications.

It is contemplated that the above-described semi-finished feature of the present invention may selectively be employed either in conjunction with, or independently of, the various other novel features of the present invention.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A precision tool set, comprising:
   (a) a sine plate including a top plate hingedly connected to a bottom plate, the top plate having a plurality of particularly dimensioned apertures formed therein according to a predetermined pattern;
   (b) at least a pair of side rails removably secured to the top plate and each being movable between an upper, operative position and a lower, inoperative position, the side rails projecting above the upper surface of the top plate when in their operative position;
   (c) a plurality of individual precision tools, each adapted to be removably mountable onto the top plate, each tool being interchangeable with any other tool, each tool having a plurality of particularly dimensioned apertures formed therein according to a predetermined pattern;
   (d) a fastener for removably mounting a precision tool onto the top plate, and
   (e) wherein when at least one precision tool is brought into abutment with the side rails, when in their operative position, (1) at least one aperture formed in the at least one tool will align and mate with at least one aperture formed in the top plate, the fastener being projectible through the mating apertures to enable removable mounting and (2) the at least one tool is precisely squared and paralleled.

2. A precision tool set in accordance with claim 1, wherein:
one of said plurality of separate precision tools comprises a magnetic chuck;
said magnetic chuck includes a top plate, a bottom plate and an intermediate housing portion, the internal magnetic chuck mechanisms of said chuck being sealed within said housing between said top plate and said bottom plate;
said magnetic chuck, having said bottom plate integrally affixed thereto, is adapted for individual use in precisely orienting and securing a workpiece thereon; and
said plurality of mating apertures are provided in said bottom plate of said chuck to permit selective interconnection of said magnetic chuck with said sine plate by means of fastening members received through a plurality of said mating apertures of said top plate of said sine plate which relatively cooperate and mate with said mating apertures of said bottom plate of said chuck.

3. A precision tool set in accordance with claim 1, wherein:
the sine plate comprises a compound sine plate which includes a top plate, a middle plate and a bottom plate;
said top plate is hingedly connected to said middle plate, and said middle plate is in turn hingedly connected to said bottom plate such that relative angular movement between said top and middle plates is substantially perpendicular to relative angular movement between said middle and bottom plates; and
said plurality of mating apertures are provided in said top plate of said compound sine plate.

4. A precision tool set in accordance with claim 3, wherein:
one of said plurality of separate precision tools comprises a magnetic chuck;
said magnetic chuck includes a top plate, a bottom plate and an intermediate housing portion, the internal magnetic chuck mechanisms of said chuck being sealed within said housing between said top plate and said bottom plate;
said magnetic chuck, having said bottom plate integrally affixed thereto, is adapted for individual use in precisely orienting and securing a workpiece thereon; and
said plurality of mating apertures are provided in said bottom plate of said chuck to permit selective interconnection of said magnetic chuck with said compound sine plate by means of fastening members received through a plurality of said mating apertures of said top plate of said compound sine plate which relatively cooperate and mate with said mating apertures of said bottom plate of said chuck.

5. A precision tool set in accordance with claim 3, wherein:
said compound sine plate is provided with a first gage block roll disposed between said top plate and said middle plate, and a second gage block roll disposed between said middle plate and said bottom plate;
each said gage block roll includes an enlarged diameter central portion and two respective recessed end portions; and
at least one of said recessed end portions of each said gage block roll is precision formed and dimensioned to provide compensating means for adjusting the angular relation of said top and middle plates, and said middle and bottom plates, in minute angular increments by operative cooperation of said recessed end portions of said gage block rolls with a precision gage block selectively positioned between said top and middle plates and/or said middle and bottom plates of said compound sine plate.

6. A precision tool set in accordance with claim 5, wherein:
each said recessed end portion of each said gage block roll is precision formed and dimensioned to provide said compensating means;
said first gage block roll is secured substantially within a forward grooved portion provided in the lower surface of said top plate;
said precision gage block is selectively positioned between the lower surface of one of said recessed end portions of said first gage block roll and the upper surface of said middle plate such that said compensating means provided by said recessed end portion compensates for a precise dimensional portion of said precision gage block;
said second gage block roll is secured substantially within a forward grooved portion provided in the lower surface of said middle plate; and
said precision gage block is selectively positioned between the lower surface of one of said recessed end portions of said second gage block roll and the upper surface of said bottom plate such that said compensating means provided by said recessed end portion compensates for a precise dimensional portion of said precision gage block.

7. A precision tool set in accordance with claim 3, wherein:
said compound sine plate is provided with a pair of locking straps;
each said locking strap is formed so as to be substantially flat, with a substantially constant width and thickness, and having a predetermined arcuate configuration;
a first one of said locking straps is affixed at a portion thereof to said bottom plate of said compound sine plate, and is affixed at a portion thereof to said middle plate of said compound sine plate, so as to permit selective pivotal movement of said middle plate relative to said bottom plate;
a second one of said locking straps is affixed at a portion thereof to said middle plate of said compound sine plate, and is affixed at a portion thereof to said top plate of said compound sine plate, so as to permit selective pivotal movement of said top plate relative to said middle plate; and
said predetermined arcuate configuration of each said locking strap prevents the uppermost arcuate surface of said first locking strap from ever rising above the planar upper surface of said middle plate of said compound sine plate, regardless of the angular position of said middle plate relative to said bottom plate, and the uppermost arcuate surface of said second locking strap from ever rising above the planar upper surface of said top plate of said compound sine plate, regardless of the angular position of said top plate relative to said middle plate.

8. A precision tool set comprising:

a plurality of separate precision tools, each adapted for individual use in precisely orienting and securing a workpiece thereon;

each said separate precision tool of said precision tool set being provided with a plurality of mating apertures;

said plurality of mating apertures of each said precision tool being particularly dimensioned and particularly arranged so as to define a mating hole pattern; and said mating hole pattern defined by said mating apertures of each said precision tool of said precision tool set being adapted to permit selective and interchangeable interconnection of desired ones of said precision tools by means of fastening members received through relative cooperating mating apertures of said desired ones of said precision tools;

one of said plurality of separate precision tools comprising a compound sine plate which includes a top plate, a middle plate and a bottom plate;

said top plate being hingedly connected to said middle plate, and said middle plate is in turn hingedly connected to said bottom plate such that relative angular movement between said top and middle plates is substantially perpendicular to relative angular movement between said middle and bottom plates;

said plurality of mating apertures being provided in said top plate of said compound sine plate; and said compound sine plate being provided with a pair of locking straps;

each said locking strap being formed so as to be substantially flat, with a substantially constant width and thickness, and having a predetermined arcuate configuration;

a first one of said locking straps being affixed at a portion thereof to said bottom plate of said compound sine plate, and is affixed at a portion thereof to said middle plate of said compound sine plate, so as to permit selective pivotal movement of said middle plate relative to said bottom plate;

a second one of said locking straps being affixed at a portion thereof to said middle plate of said compound sine plate, and is affixed at a portion thereof to said top plate of said compound sine plate, so as to permit selective pivotal movement of said top plate relative to said middle plate;

said predetermined arcuate configuration of each said locking strap preventing the uppermost arcuate surface of said first locking strap from ever rising above the planar upper surface of said middle plate of said compound sine plate, regardless of the angular position of said middle plate relative to said bottom plate, and the uppermost arcuate surface of said second locking strap from rising above the planar upper surface of said top plate of said compound sine plate, regardless of the angular position of said top plate relative to said middle plate;

each said locking strap being provided adjacent a first end thereof with a through hole, and is further provided with an arcuate elongated slot extending from substantially a central portion of said arcuate strap to a portion of said arcuate strap adjacent a second end thereof; and the radius of curvature of each said arcuate locking strap varying substantially along the length thereof such that the arcuate portion of each said locking strap between said first end and said central portion thereof has a substantially lesser radius of curvature than the radius of curvature of the arcuate portion of each said locking strap between said central portion and said second end thereof.

9. A precision tool set in accordance with claim 8, wherein:

said first end of said first locking strap is pivotably secured to a side edge of said bottom plate by fastening means received through said hole of said first strap;

said first locking strap is secured to a side edge of said middle plate of said compound sine plate by a fastening member received through said elongated slot of said first locking strap and secured to said side edge of said middle plate such that, upon angular movement of said middle plate relative to said bottom plate, said fastening member slides within said elongated slot of said first locking strap;

said fastening means and said fastening member are adapted to be tightened so as to secure said first locking strap such that the angular position of said middle plate relative to said bottom plate will be substantially locked;

said first end of said second locking strap is pivotably secured to a side edge of said middle plate by fastening means received through said hole of said second strap;

said second locking strap is secured to a side edge of said top plate of said compound sine plate by a fastening member received through said elongated slot of said second locking strap and secured to said side edge of said top plate, such that, upon angular movement of said top plate relative to said middle plate, said fastening member slides within said elongated slot of said second locking strap; and said fastening means and said fastening member are adapted to be tightened so as to secure said second locking strap such that the angular position of said top plate relative to said middle plate will be substantially locked.

10. A precision tool set in accordance with claim 1, wherein:

one of said plurality of separate precision tools comprises a sine vise which includes a vise body having an integrally upwardly-extending fixed jaw portion, an adjustable vise jaw mounted on said vise body for selective adjustment relative to said fixed jaw portion, and a bottom plate hingedly connected to said vise body; and said plurality of mating apertures are provided in said bottom plate of said sine vise to permit selective interconnection of said sine vise with said sine plate by means of fastening members received through a plurality of said mating apertures of said top plate of said sine plate which relatively cooperate and mate with said mating apertures of said bottom plate of said sine vise.

11. A precision tool set in accordance with claim 10, wherein:

said sine vise is provided with a gage block roll disposed between said vise body and said bottom plate;

said gage block roll includes an enlarged diameter central portion and at least one recessed end portion; and said recessed end portion of said gage block roll is precision formed and dimensioned to provide compensating means for adjusting the angular relation between said vise body and said bottom plate in minute angular increments by operative cooperation of said recessed end portion of said gage block roll with a precision gage block selectively positioned between said vise body and said bottom plate of said sine vise.

12. A precision tool set in accordance with claim 11, wherein:
 each respective end of said gage block roll defines one of said recessed end portions, each end portion being precision formed and dimensioned to provide said compensating means;
 said gage block roll is secured substantially within a forward grooved portion provided in the lower surface of said vise body; and
 said precision gage block is selectively positioned between the lower surface of one of said recessed end portions of said gage block roll and the upper surface of said bottom plate such that said compensating means provided by said recessed end portion compensates for a precise dimensional portion of said precision gage block.

13. A precision tool set in accordance with claim 1 or 2, wherein:
 one of said plurality of separate precision tools comprises a precision vise which includes a vise body having an integrally upwardly-extending fixed jaw portion, and an adjustable vise jaw mounted on said vise body for selective adjustment relative to said fixed jaw portion; and
 said plurality of mating apertures are provided in said vise body of said precision vise to permit selective interconnection of said precision vise with said sine plate by means of fastening members received through a plurality of said mating apertures of said top plate of said sine plate which relatively cooperate and mate with said mating apertures of said vise body of said precision vise.

14. A precision tool set in accordance with claim 13, wherein:
 the sine plate comprises a compound sine plate which includes a top plate, a middle plate and a bottom plate;
 said top plate is hingedly connected to said middle plate, and said middle plate is in turn hingedly connected to said bottom plate such that relative angular movement between said top and middle plates is substantially perpendicular to relative angular movement between said middle and bottom plates;
 said plurality of mating apertures are provided in said top plate of said compound sine plate; and
 said plurality of mating apertures provided in said vise body of said precision vise permit selective interconnection of said precision vise with said compound sine plate by means of fastening members received through a plurality of said mating apertures of said top plate of said compound sine plate which relatively cooperate and mate with said mating apertures of said vise body of said precision vise.

15. A precision tool set in accordance with claim 1 wherein:
 one of said plurality of separate precision tools comprises an angle plate having a general right-angular configuration defined by a base plate portion and a substantially perpendicular upwardly-extending plate portion;
 said plurality of mating apertures are provided in said base plate portion of said angle plate;
 said base plate portion is further provided with a plurality of holes for receiving fastening members for securing a workpiece to said angle plate; and
 said plurality of mating apertures provided in said base plate portion of said angle plate permit selective interconnection of said angle plate with said sine plate by means of fastening members received through a plurality of said mating apertures of said top plate of said sine plate which relatively cooperate and mate with said mating apertures of said base plate portion of said angle plate.

16. A precision tool set in accordance with claim 1 wherein:
 one of said plurality of separate precision tools comprises a whirl-gig including a base plate;
 said plurality of mating apertures are provided in said base plate of said whirl-gig; and
 said plurality of mating apertures provided in said base plate of said whirl-gig permit selective interconnection of said whirl-gig with said sine plate by means of fastening members received through a plurality of said mating apertures of said top plate of said sine plate which relatively cooperate and mate with said mating apertures of said base plate of said whirl-gig.

17. A precision tool set in accordance with claim 1, wherein:
 said sine plate is provided with a gage block roll disposed between said top plate and said bottom plate;
 said gage block roll includes an enlarged diameter central portion and at least one recessed end portion; and
 said recessed end portion of said gage block roll is precision formed and dimensioned to provide compensating means for adjusting the angular relation of said top and bottom plate in minute angular increments by operative cooperation of said recessed end portion of said gage block roll with a precision gage block selectively positioned between said top and bottom plates of said sine plate.

18. A precision tool set in accordance with claim 17, wherein:
 each respective end of said gage block roll defines one of said recessed end portions, each end portion being precision formed and dimensioned to provide said compensating means;
 said gage block roll is secured substantially within a forward grooved portion provided in the lower surface of said top plate; and
 said precision gage block is selectively positioned between the lower surface of one of said recessed end portions of said gage block roll and the upper surface of said bottom plate such that said compensating means provided by said recessed end portion compensates for a precise dimensional portion of said precision gage block.

19. A precision tool set in accordance with claim 1, wherein:
 said sine plate is provided with a locking strap;
 said locking strap is formed so as to be substantially flat, with a substantially constant width and thickness, and having a predetermined arcuate configuration;
 said locking strap is affixed at a portion thereof to said bottom plate of said sine plate, and at a portion thereof to said top plate of said sine plate, so as to permit selective pivotal movement of said top plate relative to said bottom plate; and said predetermined arcuate configuration of said locking strap prevents the uppermost arcuate surface of said locking strap from ever rising above the planar upper surface of said top plate of said sine plate, regardless of the angular position of said top plate relative to said bottom plate.

20. A precision tool set in accordance with claims 1, 2, 5 or 17, wherein:

at least one of said plurality of separate precision tools of said precision tool set is provided in a disassembled kit form comprised of component parts of said precision tool; and at least one of the precision surfaces of said component parts of said at least one precision tool is provided in relatively rough-finished form, ready for finish grinding to relatively exacting desired tolerance specifications by a user of said precision tool.

21. A precision tool set in accordance with claim 20, wherein:

substantially all of the inside and outside diameter precision surfaces of said component parts of said at least one precision tool are provided in finished ground form to meet relatively exacting tolerance specifications; and said mating apertures of said precision tool are precisely formed with regard to size and positioning thereof.

22. A precision tool set comprising:

a plurality of separate precision tools, each adapted for individual use in precisely orienting and securing a workpiece thereon;

each said separate precision tool of said precision tool set being provided with a plurality of mating apertures;

said plurality of mating apertures of each said precision tool being particularly dimensioned and particularly arranged so as to define a mating hole pattern; and said mating hole pattern defined by said mating apertures of each said precision tool of said precision tool set being adapted to permit selective and interchangeable interconnection of desired ones of said precision tools by means of fastening members received through relative cooperating mating apertures of desired ones of said precision tools;

one of said plurality of separate tools comprising a sine plate which includes a top plate hingedly connected to a bottom plate;

said plurality of mating apertures being provided in said top plate of said sine plate; and said sine plate being provided with a locking strap;

said locking strap being formed so as to be substantially flat, with a substantially constant width and thinkness, and having a predetermined arcuate configuration;

said locking strap being affixed at a portion thereof to a side of said bottom plate of said sine plate, and at a portion thereof to a matching side of said sine plate immediately adjacent the top surface of the upper plate, so as to permit selective pivotal movement of said top plate relative to said bottom plate;

said predetermined arcuate configuration of said locking strap being such that the locking strap never rises above the planar upper surface of said top plate of said sine plate, regardless of the angular position of said top plate relative to said bottom plate.

23. A precision tool set in accordance with claim 22, wherein:

said first end of said locking strap is pivotably secured to a side edge of said bottom plate by fastening means received through said hole of said strap;

said locking strap is secured to a side edge of said top plate of said sine plate by a fastening member received through said elongated slot of said locking strap and secured to said side edge of said top plate, such that, upon angular movement of said top plate relative to said bottom plate, said fastening member slides within said elongated slot of said locking strap; and said fastening means and said fastening member are adapted to be tightened so as to secure said locking strap such that the angular position of said top plate relative to said bottom plate will be substantially locked.

24. The precision tool set of claim 22 wherein;

(a) the locking strap has a through hole provided adjacent the first end thereof and has an arcuate elongated slot extending from substantially a central portion of said arcuate strap to a portion of said arcuate strap adjacent a second end thereof; and (b) the radius of curvature of said arcuate locking strap varying substantially along the length thereof such that the arcuate portion of said locking strap between said first end and said central portion thereof has a substantially lesser radius of curvature than the radius of curvature of the arcuate portion of said locking strap between said central portion and said second end thereof.

25. A sine plate, comprising:

A top plate hingedly connected to a bottom plate so as to permit selective angular positioning of said top plate relative to said bottom plate in minute angular increments;

said top plate of said sine plate being provided with apertures for receiving fastening members to permit selective securing of other precision tools, or a workpiece to said top plate of said sine plate;

at least one side rail secured to a side of the top plate, and being movable between an upper operative position above the upper surface of the top plate and a lower inoperative position below the upper surface of the top plate;

a locking strap having a first end pivotally secured to a side edge of the bottom plate and a second opposite end secured to a matching side edge of the top plate immediately adjacent the upper surface of the top plate, the locking strap having an arcuate elongated slot extending from substantially a central portion of the strap to a position adjacent the second end thereof, a fastening member extending through the slot and secured to the matching side edge of the top plate such that upon angular movement of the top plate relative to the bottom plate, the fastening member slide within the slot, a fastening means for pivotally securing the first end to the side edge of the bottom plate; and wherein (a) the predetermined arcuate configuration of the locking strap prevents the locking strap from ever rising above the planar upper surface of the top plate regardless of the angular position of the top plate relative to the bottom plate, (b) the fastening member and the fastening means are tightenable to secure the locking strap in any desired position to thereby fix an angular position of the top plate relative to the bottom plate, and (c) at least a plurality of said apertures formed in the top plate define mating aperture which are particularly dimensioned and particularly arranged so as to define a mating hole pattern which permits selective and interchangeable connection of other precision tools to said top plate of said sine plate by means of fastening members received through relatively cooperating mating aperture of said other precision tools.

26. A sine plate in accordance with claim 25, wherein:
said sine plate is provided with a gage block roll which includes an enlarged diameter central portion and at least one recessed end portion;
said gage block roll is secured substantially within a forward grooved portion provided in the lower surface of said top plate; and
said recessed end portion of said gage block roll is precision formed and dimensioned to provide compensating means for adjusting the angular relation between said top plate and said bottom plate in minute angular increments by selective positioning of a precision gage block between the lower surface of said recessed end portion of said gage block roll and the upper surface of said bottom plate, such that said compensating means provided by said recessed end portion compensates for a precise dimensional portion of said precision gage block.

27. A locking strap for a precision tool, comprising:
a substantially flat body having a substantially constant width and thickness and a predetermined arcuate configuration;
a first end portion of said locking strap being provided with a through hole, and an arcuate elongated slot extending from substantially a central portion of said strap to a portion of said strap adjacent a second end thereof; and
the radius of curvature of said locking strap varying substantially along the length thereof such that the arcuate portion between said first end and said central portion thereof has a substantially lesser radius of curvature than the radius of curvature of the arcuate portion of said locking strap between said central portion and said second end thereof.

28. A locking strap in accordance with claim 27, wherein:
said first end of said locking strap is adapted to be pivotably secured to a side edge of a bottom plate of said precision tool by fastening means received through said hole of said strap;
said locking strap is adapted to be secured to a side edge of an upper portion of said precision tool which is hingedly connected to said bottom plate thereof by a fastening member received through said elongated slot and secured to said side edge of said upper portion of said precision tool, such that, upon angular movement of said upper portion relative to said bottom plate of said precision tool, said fastening member slides within said elongated slot of said locking strap and the uppermost arcuate surface of said locking strap never rises above the upper surface of said upper portion of said precision tool; and
said fastening means and said fastening member are adapted to be tightened so as to secure said locking strap such that the angular position of said upper portion relative to said bottom plate of said precision tool will be substantially locked.

29. A precision tool set, comprising:
(a) a sine plate including a top plate hingedly connected to a bottom plate, the top plate having a plurality of particularly dimensioned apertures formed therein according to a predetermined pattern;
(b) at least a pair of adjacent side rails removably secured to the top plate and being movable between an upper, operative position and a lower, inoperative position, the side rails projecting above the upper surface of the top plate when in the operative position;
(c) a sine vise removably mountable onto the top plate, the sine vise having a plurality of particularly dimensioned apertures formed therein according to a predetermined pattern;
(d) a fastener for removably mounting the sine vise onto the top plate, and
(e) wherein when the sine vise is brought into abutment with the side rails, when in their operative position, (1) at least one aperture formed in the sine vise will align and mate with at least one aperture formed in the top plate, the fastener being projectible through the mating apertures to enable removable mounting and (2) the vise is accurately squared and paralleled.

* * * * *